United States Patent
Zhang et al.

(10) Patent No.: US 11,032,049 B2
(45) Date of Patent: Jun. 8, 2021

(54) METHOD AND DEVICE FOR VEHICLE TO EVERYTHING (V2X) COMMUNICATIONS AND A TRANSMITTING AND RECEIVING METHOD AND EQUIPMENT IN V2X COMMUNICATION

(71) Applicant: Samsung Electronics Co., Ltd., Gyeonggi-do (KR)

(72) Inventors: Shichang Zhang, Beijing (CN); Yingyang Li, Beijing (CN); Yi Wang, Beijing (CN)

(73) Assignee: Samsung Electronics Co., Ltd.

(*) Notice: Subject to any disclaimer, the term of this patent is extended or adjusted under 35 U.S.C. 154(b) by 0 days.

(21) Appl. No.: 16/479,357

(22) PCT Filed: Jan. 19, 2018

(86) PCT No.: PCT/KR2018/000907
§ 371 (c)(1),
(2) Date: Jul. 19, 2019

(87) PCT Pub. No.: WO2018/135905
PCT Pub. Date: Jul. 26, 2018

(65) Prior Publication Data
US 2019/0356451 A1    Nov. 21, 2019

(30) Foreign Application Priority Data

Jan. 20, 2017  (CN) .......................... 201710042455.3
Feb. 4, 2017   (CN) .......................... 201710064470.8
(Continued)

(51) Int. Cl.
*H04L 5/00*   (2006.01)
*H04W 4/44*  (2018.01)
(Continued)

(52) U.S. Cl.
CPC ............ *H04L 5/0053* (2013.01); *H04L 5/001* (2013.01); *H04L 5/0032* (2013.01);
(Continued)

(58) Field of Classification Search
CPC ..... H04L 5/0053; H04L 5/001; H04L 5/0032; H04L 5/0064; H04L 5/0091; H04W 72/0446; H04W 72/042; H04W 48/08
See application file for complete search history.

(56) References Cited

U.S. PATENT DOCUMENTS

2016/0295624 A1   10/2016   Novlan et al.
2016/0381666 A1   12/2016   Kim et al.
2017/0181150 A1*  6/2017   Lee .................. H04W 72/1257

FOREIGN PATENT DOCUMENTS

| CN | 105681439    | 6/2016  |
|----|--------------|---------|
| KR | 1020160128296| 11/2016 |
| WO | WO 2016-018068| 2/2016 |

OTHER PUBLICATIONS

PCT/ISA/210 Search Report issued on PCT/KR2018/000907, pp. 3.
(Continued)

*Primary Examiner* — Jamal Javaid
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present invention provides a method and
(Continued)

device for vehicle to everything (V2X) communications. The method comprises: receiving configuration signaling transmitted by an eNB, and then determining, according to the configuration signaling, at least one of a search space corresponding to S-DCI_C, a transmission carrier of S-DCI_C, and the number of bits corresponding to S-DCI_C; or determining, according to the configuration signaling, at least one optional time position information for transmitting a Side Link Synchronization Signal (SLSS) and a Physical Sidelink Broadcast CHannel (PSBCH), and then, based on coverage state about whether a first UE is within cellular network coverage, according to the type of a reference synchronization source, determining time position information from the at least one optional time position information for transmitting the SLSS and the PSBCH, identity information of the SLSS to be transmitted, and the value of the inCoverage field in the PSBCH to be transmitted. The present application also provides a transmitting and receiving method in V2X communication, comprising the steps of: detecting, by a first-type UE, a PSCCH in format of SCI X transmitted by other UEs, and determining, according to the SCI X, whether to further measure PSSCH-RSRP of a PSSCH scheduled by the SCI X and whether to further decode the PSSCH scheduled by the SCI X. The method provided by the present application further comprises the steps of: detecting, by a second-type UE, a PSCCH in format of SCI X transmitted by other UEs, and determining, according to a modulation and coding bit field in the SCI X and a predefined TBS mapping rule, a TBS of a PSSCH scheduled by the SCI X. The method provided by the present application further comprises the step of: determining, by the second-type UE and according to a modulation scheme, the transmitting power of the PSCCH of the SCI X and the transmitting power of the PSSCH scheduled by the SCI X.

By the above method, the coexistence of a first-type V2X UE and a second-type V2X UE can be better realized, and the transmission efficiency of the second-type V2X UE can be improved.

16 Claims, 4 Drawing Sheets

(30) Foreign Application Priority Data

Mar. 24, 2017 (CN) .......................... 201710184281.4
Apr. 21, 2017 (CN) .......................... 201710265252.0

(51) Int. Cl.
  *H04W 72/04* (2009.01)
  *H04W 48/08* (2009.01)
  *H04L 5/14* (2006.01)
(52) U.S. Cl.
  CPC .......... *H04L 5/0064* (2013.01); *H04L 5/0091* (2013.01); *H04W 4/44* (2018.02); *H04W 48/08* (2013.01); *H04W 72/042* (2013.01); *H04W 72/0446* (2013.01); *H04L 5/14* (2013.01)

(56) References Cited

OTHER PUBLICATIONS

PCT/ISA/237 Written Opinion issued on PCT/KR2018/000907, pp. 5.
Huawei, HiSilicon, 3GPP TSG RAN WG1 Meeting #86, R1-166203, Gothenburg, Sweden, Aug. 12, 2016, "DCI design for V2V", pp. 5.

* cited by examiner

[Fig. 1]
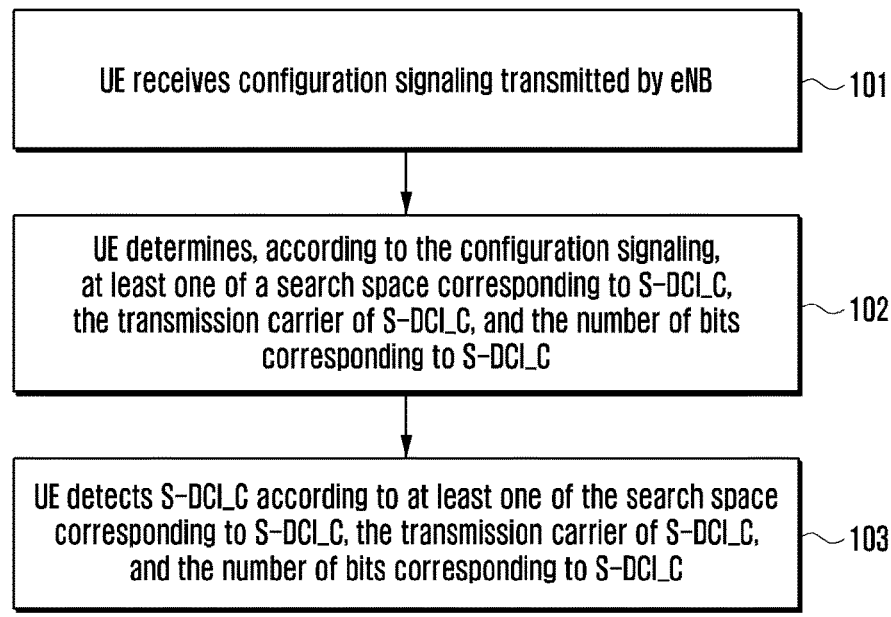
[Fig. 2]
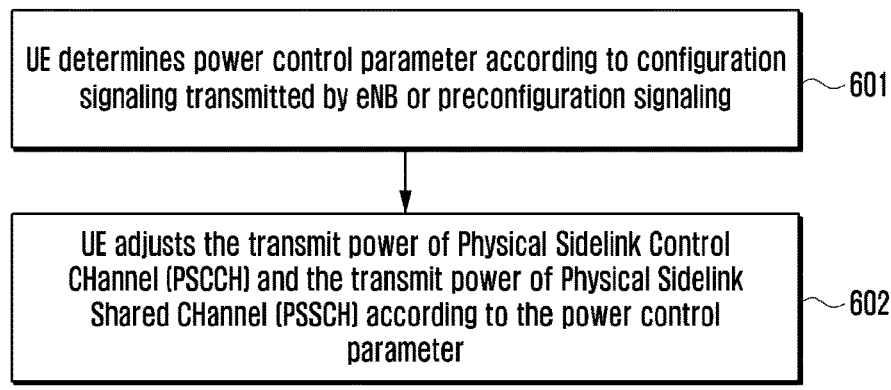
[Fig. 3]
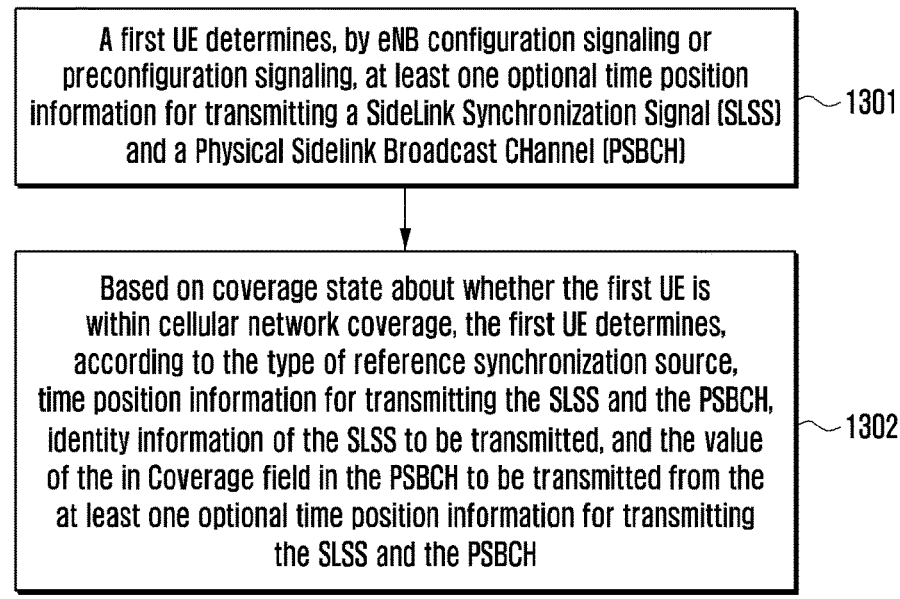

[Fig. 4]
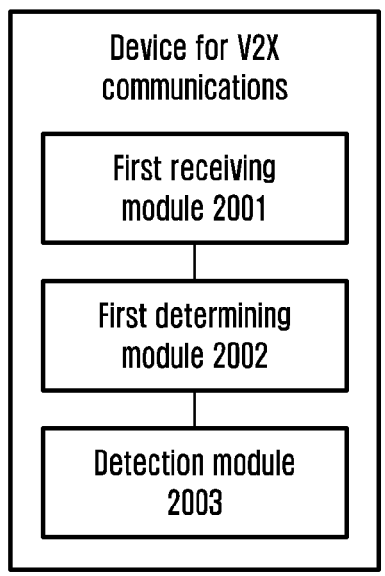
[Fig. 5]
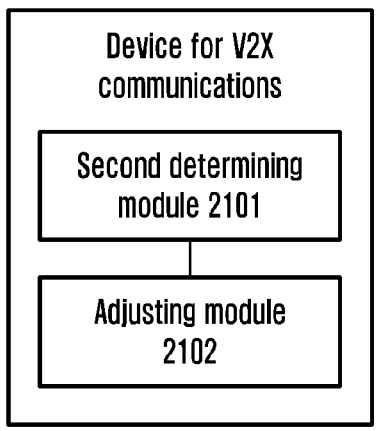
[Fig. 6]
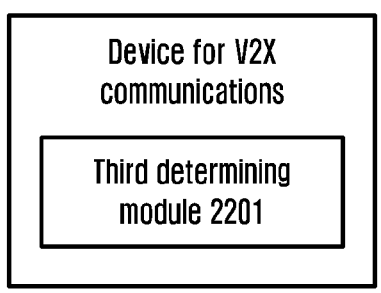

[Fig. 7]
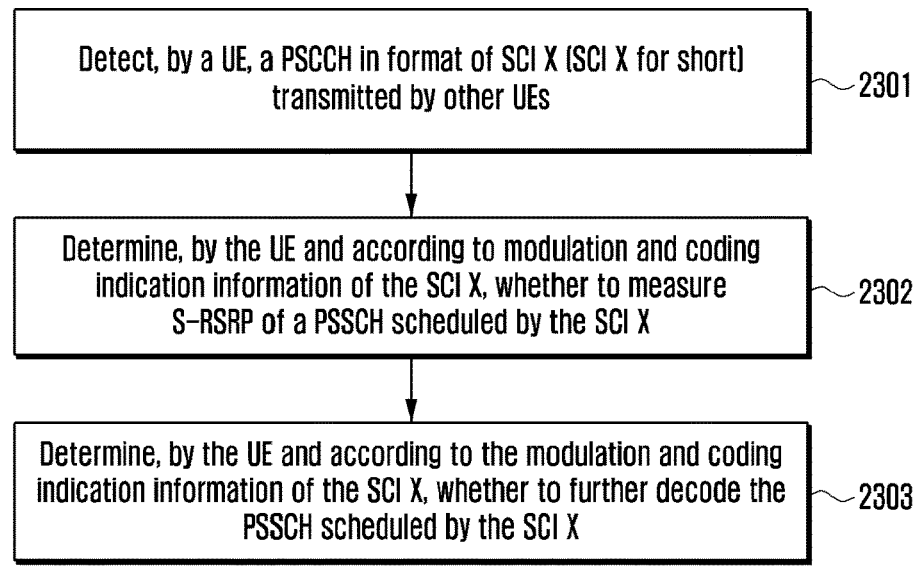
[Fig. 8]
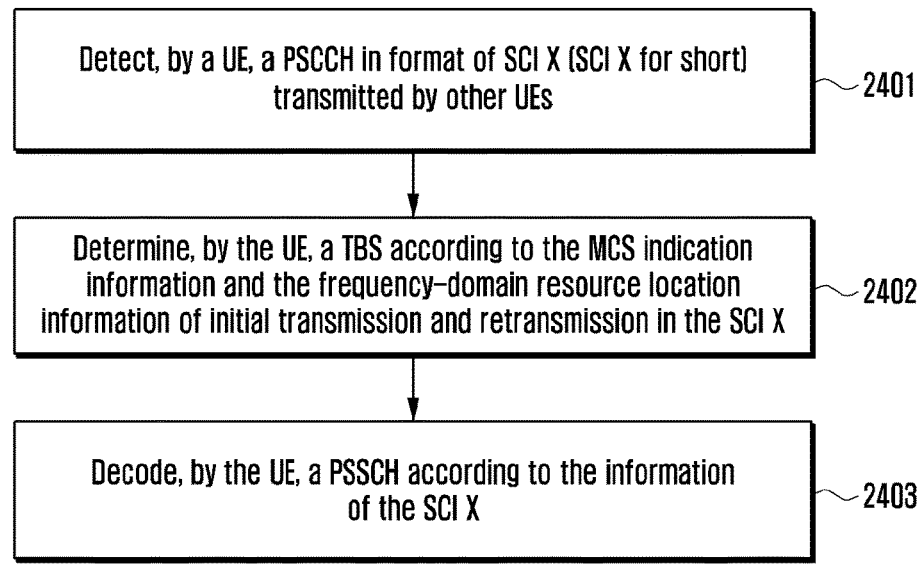
[Fig. 9]
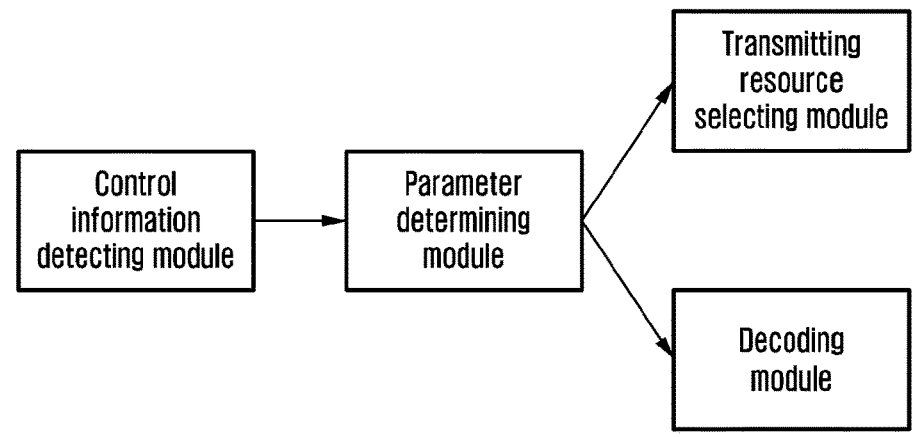

[Fig. 10]
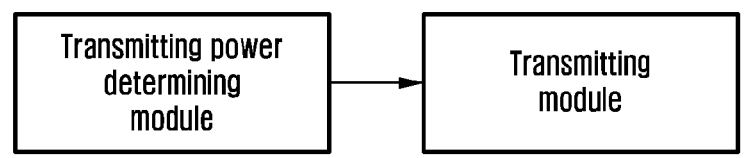

METHOD AND DEVICE FOR VEHICLE TO EVERYTHING (V2X) COMMUNICATIONS AND A TRANSMITTING AND RECEIVING METHOD AND EQUIPMENT IN V2X COMMUNICATION

PRIORITY

This application is a National Phase Entry of PCT International Application No. PCT/KR2018/000907 which was filed on Jan. 19, 2018, and claims priority to Chinese Patent Application Nos. 201710042455.3, 201710064470.8, 201710184281.4 and 201710265252.0, which were filed on Jan. 20, 2017, Feb. 4, 2017, Mar. 24, 2017 and Apr. 21, 2017, respectively, the content of each of which is incorporated herein by reference.

TECHNICAL FIELD

The present invention relates to communication technology and, more specifically, to a method and device for V2X communications and to a method for transmitting and receiving Sidelink Control Information (SCI) carried on a PSCCH in V2X communication and a method for measuring and decoding a PSSCH scheduled by the SCI.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Device to Device (D2D) communication technology has been standardized in 3GPP by virtue of its enormous potential value in the field of public security and general civil communications. In the 3GPP standard, the direct communication link between a device and another device is called a sidelink, which is similar with an uplink and a downlink There are also a control channel and a data channel on the sidelink. The former is called a Physical Sidelink Control CHannel (PSCCH), and the latter is called a Physical Sidelink Shared Channel (PSSCH). The PSCCH is for indicating information such as the time-frequency domain resource position of PSSCH transmission, the modulation and coding mode, and the reception target ID for the PSSCH. The PSSCH is for carrying data.

Because the D2D communication standardized in 3GPP is mainly for low-speed terminals and for services with low requirement on delay sensitivity and reception reliability, the implemented D2D function cannot meet the needs of users. Therefore, based on the current D2D broadcast communication mechanism, 3GPP further implements standardization of some functions supporting direct communications, with low delay and high reliability, between high-speed devices, between a high-speed device and a low-speed device, and between a high-speed device and a stationary device, i.e. Vehicle to Vehicle/Perdestrian/Infrastructure/Network(for short, V2X) communications. Thus, currently the sidelink communications in 3GPP involve two different modes: D2D and V2X.

Since the V2X communications service has a natural periodicity, it is possible to generate multiple periodic services for each terminal participating in theV2X communications. Thus, a Semi-Persistent Scheduling (SPS) is introduced in the current standardized V2X system. According to this, in the resource allocation mode controlled by the eNB in the V2X communications (Mode 3), the eNB will configure, through the RRC layer signaling, one or more SPS configurations for the UE performing the V2X communications. When the UE generates a service complying with a certain SPS configuration, the eNB can transmit, through a downlink control channel, a corresponding Downlink Control Information (DCI) to activate the corresponding SPS configuration; when the UE generates the service no longer, the eNB can transmit a corresponding DCI to release the SPS configuration corresponding to the service. Since the DCI format that supports SPS activation and release is different from the existing DCI format, if the DCI format and the existing DCI format are mapped to the same UE specific downlink search space, the number of times of blind detection in the UE downlink control channel will be increased.

In addition, a congestion control mechanism is also introduced in V2X, wherein the UE will adjust maximum transmit power, Modulation and Coding Scheme (MCS), maximum resource occupancy ratio, the maximum number of times of transmission and the like to adapt to current congestion level. Since in the meantime it is necessary for the UE to support open-loop power control to reduce the interference to the eNB uplink reception, the congestion control and the uplink interference control cannot be simultaneously met.

For UEs that support V2X communications, they are capable of receiving Global Navigation Satellite System (GNSS) signals. Thus, a GNSS-based synchronization mechanism is introduced in the V2X communications system. According to this mechanism, both a UE, which is in a cellular network cell coverage and capable of accurately receiving a GNSS signal, and a UE, which is out of the cellular network cell and capable of accurately receiving a GNSS synchronization signal, can transmit a Side Link Synchronization Signal (SLSS) and a Physical Side link Broadcast CHannel (PSBCH), while PSBCH contents of the two UEs may be different from each other. When the two UEs, or UEs using the two UEs as reference synchronization sources, transmit PSBCHs at the same time-frequency resource, there will be interference between each other, resulting in PSBCH detection failure.

Through the above analysis, it can be seen that a new resource scheduling mechanism, congestion control mechanism and a new synchronization mechanism are introduced in the current V2X communications system, improving the performance of the V2X communications system, but also causing a number of problems. For these problems, presently there is no ideal technical solution.

In the 3GPP standard, a direct communication link from an equipment to an equipment is called a sidelink Similar to the uplink and downlink links for cellular, the sidelink also has control channels and shared data channels. The former is called PSCCHs, and the latter is called PSSCHs. The PSCCHs are used for indicating the time-frequency domain resource location and the modulation and coding scheme for PSSCH transmission, the priority of data carried on a PSSCH, or more; and the PSSCHs are used for carrying data.

The control information and data in the V2X communication can be transmitted by the sidelink. In this case, the V2X communication includes two transmission modes, i.e., transmission mode 3 (Mode 3) and transmission mode 4 (Mode 4). In the Mode 4, transmission resources for PSCCHs and PSSCHs are autonomously selected by a UE according to the result of channel detection. During the channel detection, the UE determines the time-frequency resource location and priority of the scheduled PSSCH by receiving PSCCHs transmitted by other UEs, then detects the reference signal received power of the scheduled PSSCH (PSSCH-RSRP), and excludes resources having PSSCH-RSRP greater than a specific threshold. Subsequently, the UE calculates a Sidelink-Received Signal Strength Indicator (S-RSSI) of the remaining resources and randomly selects, from part of resources having the lowest S-RSSI, a resource as a transmission resource.

In the V2X communication in the LTE Rel-14, due to the implementation complexity, it is stipulated that the PSSCH transmission employs only QPSK and 16 QAM modulation, rather than 64 QAM modulation. For a V2X equipment in the LTE Rel-15 or greater, with the enhancement of the equipment capability, 64 QAM modulation will be supported to increase the transmission rate. In order to support the coexistence of a V2X equipment (called a first-type V2X UE) in the LTE Rel-14 and a V2X equipment (called a second-type V2X UE) in the LTE Rel-15 or greater, it is required that the first-type V2X UE can decode the Sidelink Control Information (SCI) of the second-type V2X UE and select its transmission resource according to the SCI. Therefore, it is necessary to define behaviors of the first-type V2X UE upon receiving the SCI indicating 64 QAM. The SCI has different formats, and the SCIs in various formats are collectively called SCI X.

DISCLOSURE OF INVENTION

Technical Problem

Generally, during the initial transmission of a data packet, if the coding rate exceeds 0.93, the UE may be unable to correctly decode the data packet. Therefore, the UE cannot decode this data packet. In the LTE Rel-14 V2X communication, among 14 symbols of a subframe, since the first symbol is used for Automatic Gain Control (AGC) adjustment, the $3^{th}$, $6^{th}$, $9^{th}$ and $12^{th}$ symbols are used for mapping demodulation reference signals (DM-RSs) and the last symbol is used as a gap, there are only eight symbols actually available for the effective transmission of data. In the Rel-15 or greater, after 64 QAM is introduced and if there are still eight available symbols, in an existing MCS table, it is possible that the coding rate of multiple MCS indexes exceeds 0.93 so that the UE cannot decode correctly. Therefore, it is necessary to adjust the existing MCS table.

In addition, in the existing LTE Rel-14 V2X communication, a PSCCH in format of SCI X is transmitted only once, but two times of transmission of the PSSCH is scheduled. In order to ensure the same reception performance, the power of the PSCCH in format of SCI X is two times of the power of the PSSCH scheduled by the SCI X. However, in the LTE Rel-15 or greater, with the increase in modulation and coding rate of the PSSCH, to realize the same reception performance of the PSSCH and the PSCCH, the existing power relationship is not optimal and needs to be improved.

Solution to Problem

In order to overcome the above technical problems or at least partially solve the above technical problems, the following technical solutions are proposed.

According to one aspect of the present invention, a method of vehicle to everything (V2X) communications is provided, the method comprising the following steps:

receiving configuration signaling transmitted by the eNB, the configuration signaling comprising at least one of an index corresponding to a carrier C configured with Mode 3 resource pool, a carrier SC for transmission of downlink control information S-DCI_C used for scheduling sidelink transmission on the carrier C, and maximum index value $n_{CI\_m}$ corresponding to the carrier C;

determining, according to the configuration signaling, at least one of a search space corresponding to the S-DCI_C, the transmission carrier of the S-DCI_C, and the number of bits corresponding to the S-DCI_C; and detecting the S-DCI_C according to at least one of the search space corresponding to the S-DCI_C, the transmission carrier of the S-DCI_C, and the number of bits corresponding to the S-DCI_C.

According to another aspect of the present invention, a device for vehicle to everything (V2X) communications is provided, the device comprising:

a first receiving module for receiving configuration signaling transmitted by the eNB, wherein the configuration signaling comprises at least one of an index $n_C$ corresponding to a carrier C configured with Mode 3 resource pool, a carrier SC for transmission of downlink control information S-DCI_C used for scheduling sidelink transmission on the carrier C, and maximum index value $n_{CI\_m}$ corresponding to the carrier C;

a first determining module for determining, according to the configuration signaling, at least one of a search space corresponding to the S-DCI_C, the transmission carrier of the S-DCI_C, and the number of bits corresponding to the S-DCI_C; and a detection module for detecting the S-DCI_C according to at least one of the search space corresponding to the S-DCI_C, the transmission carrier of the S-DCI_C, and the number of bits corresponding to the S-DCI_C.

According to another aspect of the present invention, another method of vehicle to everything (V2X) communications is provided, the method comprising the following steps:

determining power control parameter according to configuration signaling transmitted by the eNB or preconfiguration signaling, wherein the power control parameter comprises at least one of open-loop power control parameter, and maximum transmit power corresponding to current resource pool congestion level and the priority of data transmission; and adjusting transmit power of a Physical Sidelink Control CHannel (PSCCH) and transmit power of a Physical Sidelink Shared CHannel (PSSCH) according to the power control parameter.

According to another aspect of the present invention, another device for V2X communications is provided, the device comprising:

a second determining module for determining power control parameter according to configuration signaling transmitted by the eNB or preconfiguration signaling, wherein the power control parameter comprises at least one of open-loop power control parameter, and maximum transmit power corresponding to congestion level of current resource pool and a priority of data to be transmitted; and an adjusting module for adjusting transmit power of a Physical Sidelink Control CHannel (PSCCH) and transmit power of a Physical Sidelink Shared CHannel (PSSCH) according to the power control parameter.

According to a further aspect of the present invention, a further method of vehicle to everything (V2X) communications is provided, the method comprising the following steps:

determining, by the eNB configuration signaling or preconfiguration signaling, at least one optional time position information for transmitting a Side Link Synchronization Signal (SLSS) and a Physical Sidelink Broadcast CHannel (PSBCH); and based on coverage state about whether a first UE is within cellular network coverage, according to the type of a reference synchronization source, determining time position information from the at least one optional time position information for transmitting the SLSS and the PSBCH, identity information of the SLSS to be transmitted, and the value of the inCoverage field in the PSBCH to be transmitted.

According to another aspect of the present invention, a further device for V2X communications is provided, the device comprising:

a third determining module for determining, by the eNB configuration signaling or preconfiguration signaling, at least one optional time position information for transmitting a Side Link Synchronization Signal (SLSS) and a Physical Sidelink Broadcast CHannel (PSBCH), wherein, based on coverage state about whether a first UE is within cellular network coverage, the third determining module further determines, according to the type of a reference synchronization source, time position information from the at least one optional time position information for transmitting the SLSS and the PSBCH, identity information of the SLSS to be transmitted, and the value of the inCoverage field in the PSBCH to be transmitted.

The present invention provides a method and device for V2X communications. Compared with the prior art, the present invention can determine, by receiving the configuration signaling transmitted by the eNB, at least one of a search space corresponding to S-DCIC, the transmission carrier of S-DCI_C and the number of bits corresponding to S-DCI_C according to the configuration signaling, and can detect S-DCI_C according to at least one of the search space corresponding to S-DCI_C, the transmission carrier of S-DCI_C, and the number of bits corresponding to S-DCI_C. That is, the search space of S-DCI_C can be determined, or it can be ensured that the number of bits of S-DCI_C is equal to the number of bits of any other DCI mapped to the search space, so that S-DCI_C can be detected from the corresponding search space and then the number of times of blind detection in the UE downlink control channel can be reduced.

The present invention determines power control parameter according to configuration signaling transmitted by the eNB or preconfiguration signaling, and adjusts the transmit power of the PSCCH and the transmit power of the PSSCH according to the power control parameter, wherein the power control parameter comprises at least one of open-loop power control parameter, and the maximum transmit power corresponding to the congestion level of current resource pool and the priority of data to be transmitted. That is, the present invention can adjust the transmit power according to current congestion level and open-loop power. That is, the control parameter used to adjust the transmit power can simultaneously satisfy the current congestion level and the uplink control, so that it can be ensured that the adjusted transmit power simultaneously satisfies the congestion control and uplink interference control requirements.

The present invention determines, by the eNB configuration signaling or preconfiguration signaling, at least one optional time position information for transmitting the SLSS and the PSBCH, and can determine, according to the type of the reference synchronization source, specific time position information from the at least one optional time position information for transmitting the SLSS and the PSBCH, the identity information of the SLSS to be transmitted, and the value of the inCoverage field in the PSBCH to be transmitted. That is, the specific time position information for the SLSS and the PSBCH to be transmitted, the identity information of the SLSS to be transmitted and the value of the inCoverage field in the PSBCH to be transmitted can be determined according to the cellular network state information and the type of the reference synchronization source, thereby avoiding interference between a UE, which is within the cellular network cell coverage and capable of accurately receiving a GNSS signal, and a UE, which is out of the cellular network cell and capable of accurately receiving a GNSS synchronization signal, or there is no interference between UEs using the above two UEs as reference synchronization sources, so that the PSBCH could be successfully detected.

The present application also provides a transmitting and receiving method and equipment in V2X communication in order to better realize the coexistence of a first-type V2X UE and a second-type V2X UE.

The present application discloses a receiving method in Vehicle to Vehicle/Pedestrian/Infrastructure/Network (V2X) communication, comprising the steps of:

A. receiving, by a User Equipment (UE), a Physical Sidelink Control Channel (PSCCH) transmitted by other UEs, and detecting Sidelink Control Information (SCI) transmitted through the PSCCH;

B. determining, by the UE and according to the SCI, parameter information of a Physical Sidelink Shared Channel (PSSCH) scheduled by the SCI;

C. determining, by the UE and according to the parameter information of the PSSCH, whether to receive and measure reference signal received power of the PSSCH (PSSCH-RSRP) scheduled by the SCI and/or a sidelink received signal strength indicator (S-RSSI) of the remaining resources, and selecting a transmission resource according to the measured information; and D. receiving, by the UE and according to the SCI, the PSSCH scheduled by the SCI, and determining whether to decode the PSSCH according to the SCI.

Preferably, the step B comprises: determining, by a first-type V2X UE and according to a value $I_{MCS}$ of a Modulation and Coding Scheme (MCS) bit field of the SCI, a modulation scheme of the PSSCH of the other UEs, and correspondingly, the first-type V2X UE implements the steps C and D by at least one of the following ways:

way 1: if $I_{MCS}>20$, the first-type V2X UE measures the PSSCH-RSRP of the scheduled PSSCH and/or the S-RSSI according to the parameter information of the PSCCH and then selects a transmission resource according to the measured information, and the first-type V2X UE decodes or skips decoding of the PSSCH scheduled by the PSCCH;

way 2: if $I_{MCS}>20$, when the modulation scheme satisfies $Q'=\min(4,Q'_m)=4$ and the calculated effective channel coding rate is greater than a set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes or skips decoding of the PSSCH scheduled by the PSCCH; and, when the modulation scheme satisfies $Q'=\min(4,Q'_m)=4$ and the calculated effective channel coding rate is less than or equal to the set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes the PSSCH scheduled by the PSCCH;

way 3: if $20<I_{MCS}<29$, when the modulation scheme satisfies $Q'=\min(4,Q'_m)=4$ and the calculated effective channel coding rate is greater than the set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes or skips decoding of the PSSCH scheduled by the PSCCH; when the modulation scheme satisfies $Q'=\min(4,Q'_m)=4$ and the calculated effective channel coding rate is less than or equal to the set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes the PSSCH scheduled by the PSCCH; when $I_{MCS}\geq 29$, the first-type V2X UE decodes or skips decoding of the PSSCH, and skips measurement of the PSSCH-RSRP; and, when $I_{MCS}=29\sim 31$, $I_{MCS}$ is also not used by a second-type V2X UE to indicate an MCS of a PSSCH; and way 4: if $I_{MCS}>20$, when the modulation scheme satisfies $Q'=\min(4,Q'_m)=4$, the first-type V2X UE decides the number of expectedly received PSSCHs scheduled by the PSCCH and calculates an effective channel coding rate; if the effective channel coding rate is greater than the set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes or skips decoding of the PSSCH scheduled by the PSCCH; and, when the modulation scheme satisfies $Q'=\min(4,Q'_m)=4$ and the calculated effective channel coding rate is less than or equal to the set threshold Thc, the first-type V2X UE measures the PSSCH-RSRP of the scheduled PSSCH and/or the S-RSSI according to the parameter information of the PSCCH and then selects a transmission resource according to the measured information, and the first-type V2X UE decodes the PSSCH scheduled by the PSCCH;

wherein, $Q'_m$, is a modulation scheme determined according to $I_{MCS}$.

Preferably, the step B comprises: determining, by the first-type V2X UE and according to a resource reservation bit field of the SCI, resource reservation information of the PSSCH of the other UEs, and correspondingly, the first-type V2X UE implements the steps C and D by the following way:

way 5: if the value indicated by the resource reservation bit field in the PSCCH of the other UEs is greater than or equal to Thr_int, the first-type V2X UE measures the PSSCH-RSRP of the scheduled PSSCH and/or the S-RSSI according to the parameter information of the PSCCH, then selects a transmission resource according to the measured information, and decodes or skips decoding of the PSSCH scheduled by the PSCCH, wherein, the first-type V2X UE measures the RSSCH-RSRP based on the PSSCH scheduled by the PSCCH and does not apply the result of measurement to subframes of other subsequently transmitted PSSCHs.

Preferably, if the first-type V2X UE decides, according to the received MCS information of the PSCCH, whether a Transport Block Size (TBS) exceeds the maximum UE capability, the first-type V2X UE measures the PSSCH-RSRP of the scheduled PSSCH and/or the S-RSSI according to the information of the PSCCH, then selects a transmission resource according to the measured information, and decodes or skips decoding of the PSSCH scheduled by the PSCCH.

Preferably, the step B comprises: determining, by a second-type V2X UE and according to the SCI, an effective channel coding rate of the PSSCH scheduled by the received PSCCH of the other UEs;

The second-type V2X UE implements the selecting a transmission resource according to the measured information in the C by at least one or more of the following ways:
way 1: the UE performing transmission resource selection determines, according to the modulation scheme to be used by the UE performing transmission resource selection, a threshold for the PSSCH-RSRP from other UEs. If the PSSCH-RSRP from the other UEs is greater than the threshold, during the selection of the transmission resource, resources corresponding to the PSSCH are excluded.

Further, the PSSCH-RSRP threshold corresponding to a 64 QAM modulation scheme is less than the PSSCH-RSRP threshold corresponding to a QPSK or 16 QAM modulation scheme.

Way 2: After the UE performing transmission resource selection excludes the resources having PSSCH-RSRP greater than the PSSCH-RSRP threshold, the proportion of the remaining resources in the total resources within a resource selection window shall not be less than a specific threshold Thr_step2_ratio; the UE performing transmission resource selection calculates the sidelink received signal strength indicator (S-RSSI) of the remaining resources, and successively selects resources from the remaining resources in an ascending order, until the proportion of all the selected resources in the total resources within the resource selection window shall not be less than a specific threshold Thr_step3_ratio; and, the UE randomly selects, from the selected resources, a resource as a transmission resource. The specific threshold Thr_step2_ratio and/or Thr_step3_ratio needs to be determined according to the modulation scheme to be used by the UE performing transmission resource selection.

Further, the specific threshold corresponding to the 64 QAM modulation scheme is less than the specific threshold corresponding to the QPSK or 16 QAM modulation scheme.

Way 3: The UE performing transmission resource selection needs to determine, according to the modulation scheme indicated by the received PSCCH from other UEs, a threshold for the PSSCH-RSRP from the other UEs.

Further, when the modulation scheme indicated by the PSCCH from the other UEs is 64 QAM, the PSSCH-RSRP threshold is less than the PSSCH-RSRP threshold in which the modulation scheme indicated by the PSCCH is QPSK or 16 QAM.

The second-type V2X UE implements the steps C and D by the following ways:

way 6: if the effective channel coding rate of the PSSCH scheduled by the received PSCCH of the other UEs is greater than the set threshold Thc, the second-type V2X UE measures the PSSCH-RSRP of the scheduled PSSCH and/or the S-RSSI according to the information of the PSCCH and then selects a transmission resource according to the measured information, and the second-type V2X UE decodes or skips decoding of the PSSCH scheduled by the PSCCH; and way 7: if the effective channel coding rate of the PSSCH scheduled by the received PSCCH of the other UEs is greater than the set threshold Thc, the second-type V2X UE does not measure the PSSCH-RSRP of the scheduled PSSCH and/or the S-RSSI according to information of the PSCCH, and may decode or skip decoding the PSSCH scheduled by the PSCCH.

Preferably, the step B comprises: determining, by the UE, a TBS according to MCS indication information and frequency-domain resource location information of the SCI.

Preferably, the TBS is determined by at least one of the following ways:

way 1 for determining TBS: the number $N'_{PRB}$ of PRBs occupied by the PSSCH scheduled by the PSCCH is determined according to the frequency-domain resource location information indicated in the received PSCCH, and the TBS is determined in a look-up table manner according to $N_{PRB}$, wherein, $N_{PRB} = \max\{\lfloor N'_{PRB} \times \beta \rfloor, 1\}$:

Preferably, for PSSCHs having different transmission time lengths, the used $\beta$ can be different.

way 2 for determining TBS: when $I_{MCS} > Th\_mcs1$, the number $N'_{PRB}$ of PRBs occupied by the PSSCH scheduled by the PSCCH is determined according to the frequency-domain resource location information indicated in the received PSCCH, and the TBS is determined in a look-up table manner according to $N_{PRB}$, wherein, $N_{PRB} = \max\{\lfloor N'_{PRB} \times \beta \rfloor, 1\}$; and, when $I_{MCS} \leq Th\_mcs1$, the number $N'_{PRB}$ of PRBs occupied by the PSSCH scheduled by the PSCCH is determined according to the frequency-domain resource location information indicated in the received PSCCH, and the TBS is determined in a look-up table manner according to $N'_{PRB}$, wherein, the Th_mcs1 is a preset value.

Preferably, for PSSCHs having different transmission time lengths, the used $\beta$ can be different.

Preferably, for PSSCHs having different transmission time lengths, the corresponding Th_mcs1 can be different.

way 3 for determining TBS: for a UE capable of identifying whether the received PSCCH is from the first-type V2X UE or the second-type V2X UE:

if the received PSCCH is from the first-type V2X UE, the number $N'_{PRB}$ of PRBs occupied by the PSSCH scheduled by the PSCCH is determined according to the frequency-domain resource location information indicated in the received PSCCH, and the TBS is determined in a look-up table manner according to $N'_{PRB}$; and if the received PSCCH is from the second-type V2X UE, the number $N'_{PRB}$ of PRBs occupied by the PSSCH scheduled by the PSCCH is determined according to the frequency-domain resource location information indicated in the received PSCCH, and the TBS is determined in a look-up table manner according to $N_{PRB}$, wherein, $N_{PRB} = \max\{\lfloor N'_{PRB} \times \beta \rfloor, 1\}$; or, if the received PSCCH is from the second-type V2X UE, when $I_{MCS} > Th\_mcs1$, the number $N'_{PRB}$ of PRBs occupied by the PSSCH scheduled by the PSCCH is determined according to the frequency-domain resource location information indicated in the received PSCCH, and the TBS is determined in a look-up table manner according to $N_{PRB}$, wherein, $N_{PRB} = \max\{\lfloor N'_{PRB} \times \beta \rfloor, 1\}$; and, when $I_{MCS} \leq Th\_mcs1$, the number $N'_{PRB}$ of PRBs occupied by the PSSCH scheduled by the PSCCH is determined according to the frequency-domain resource location information indicated in the received PSCCH, and the TBS is determined in a look-up table manner according to $N'_{PRB}$.

Preferably, for way 1 for determining TBS, $\beta = 0.75$, or $\beta = 0.8$, or $\beta = 2/3$, or $\beta$ is a configured non-negative number not greater than 1.

Preferably, for the way 2 for determining TBS:

the Th_mcs1 is the minimum $I_{MCS}$ corresponding to 64 QAM;

or, Th_mcs1=18;

or, the corresponding Th_mcs1 is respectively determined with respect to the number of PRBs possibly occupied by the PSSCH, so that, after all $I_{MCS}$ corresponding to 64 QAM and $I_{MCS}$ in 16 QAM possibly resulting in an effective coding rate greater than 0.93 are weighted by $N'_{PRB}$, the effective coding rate of the corresponding TBS is less than or equal to 0.93;

or, Th_mcs1=23.

The present application further provides a user equipment, comprising a control information detecting module, a parameter determining module, a transmission resource selecting module and a decoding module, wherein:

the control information detecting module, for receiving a Physical Sidelink Control Channel (PSCCH) transmitted by other UEs and detecting Sidelink Control Information (SCI) transmitted through the PSCCH;

the parameter determining module, for determining parameter information of a Physical Sidelink Shared Channel (PSSCH) scheduled by the SCI according to the SCI;

the transmission resource selecting module, for determining, according to the parameter information of the PSSCH, whether to receive and measure PSSCH-RSRP of the PSSCH scheduled by the SCI and/or a sidelink received signal strength indicator (S-RSSI), and selecting a transmission resource according to the measured information; and the decoding module, for receiving, according to the SCI, the PSSCH scheduled by the SCI, and determining, according to the SCI, whether to decode the PSSCH.

The present application further provides a method for determining channel transmitting power, comprising:

for Sidelink Control Information (SCI) carried on a Physical Sidelink Control Channel (PSCCH) and a Physical Sidelink Shared Channel (PSSCH) scheduled by the SCI, determining a Power Spectrum Density (PSD) offset of the PSSCH and the PSCCH by at least one of the following ways:

way 1: the PSD offset of the PSCCH relative to the PSSCH is not related to a modulation scheme of the PSSCH and a modulation scheme of the PSCCH, and the total power of the PSSCH and the PSCCH increases with the increase of the modulation scheme of the PSSCH and/or the modulation scheme of the PSCCH;

way 2: the PSD offset of the PSCCH relative to the PSSCH is related to a modulation scheme of the PSSCH and a modulation scheme of the PSCCH, and the total power of the PSSCH and the PSCCH increases with the increase of the modulation scheme of the PSSCH and/or the modulation scheme of the PSCCH; and way 3: the PSD of the PSSCH is determined according to the modulation scheme of the PSSCH.

The present invention further provides a user equipment, comprising a transmitting power determining module and a transmitting module, wherein:

for Sidelink Control Information (SCI) carried on a Physical Sidelink Control Channel (PSCCH) and a Physical Sidelink Shared Channel (PSSCH) scheduled by the SCI, the transmitting power determining module, for determining a Power Spectrum Density (PSD) offset of the PSSCH and the PSCCH by at least one of the following ways:

way 1: the PSD offset of the PSCCH relative to the PSSCH is not related to a modulation scheme of the PSSCH and a modulation scheme of the PSCCH, and the total power of the PSSCH and the PSCCH increases with the increase of the modulation scheme of the PSSCH and/or the modulation scheme of the PSCCH;

way 2: the PSD offset of the PSCCH relative to the PSSCH is related to a modulation scheme of the PSSCH and a modulation scheme of the PSCCH, and the total power of the PSSCH and the PSCCH increases with the increase of the modulation scheme of the PSSCH and/or the modulation scheme of the PSCCH; and way 3: the PSD of the PSSCH is determined according to the modulation scheme of the PSSCH; and the transmitting module, for performing transmission according to the power determined by the transmitting power determining module.

Advantageous Effects of Invention

It can be seen from the above technical solutions that, in the transmitting and receiving method in V2X communication provided by the present application, when a V2X UE in a lower release and a V2X UE in a higher release share a resource pool, the interference level of resources possibly occupied by the opposite party can be determined according to the scheduling information of the opposite party, so that the strong-interference resources can be avoided during the selection of a transmission resource. Moreover, in the present invention, a V2X UE can determine a proper transport block size according to actually available resources, so that the transmission efficiency is improved.

Additional aspects and advantages of the present invention will be set forth in part in the following description, which will become apparent from the following description or may be learned by practice of the present invention.

BRIEF DESCRIPTION OF DRAWINGS

The foregoing and/or additional aspects and advantages of the present invention will become apparent and readily understood from the following description of the embodiments in conjunction with the accompanying drawings in which:

FIG. 1 is a flowchart of a method of V2X communications according to an embodiment of the present invention;

FIG. 2 is a flowchart of another method of V2X communications according to an embodiment of the present invention;

FIG. 3 is a flowchart of a further method of V2X communications according to an embodiment of the present invention;

FIG. 4 is a schematic structure diagram of a device for V2X communications according to an embodiment of the present invention;

FIG. 5 is a schematic structure diagram of another device for V2X communications according to an embodiment of the present invention; and FIG. 6 is a schematic structure diagram of a further device for V2X communications according to an embodiment of the present invention;

FIG. 7 is a flowchart of a method for receiving a PSCCH in V2X communication according to Embodiment 20 of the present invention;

FIG. 8 is a flowchart of a method for receiving a PSCCH in V2X communication according to Embodiment 21 of the present invention;

FIG. 9 is a composition structure diagram of a preferred user equipment according to the present application; and FIG. 10 is a composition structure diagram of another preferred user equipment according to the present application.

MODE FOR THE INVENTION

Embodiments of the present invention are described in detail below, examples of which are shown in the accompanying drawings, wherein throughout the same or similar reference numbers refer to the same or similar elements or elements having the same or similar functions. The embodiments described below with reference to the accompanying drawings are exemplary, only for explaining the present invention and not to be construed as limiting the present invention.

Those skilled in the art could appreciate that the wording "a", "an", "said" or "the" as used herein should be construed to cover both the singular and the plural, unless specifically stated otherwise. It should be further appreciated that the wording "comprise" or "include" as used in the specification of the present invention refers to presence of said feature, integer, step, operation, element and/or component, but does not exclude presence or addition of one or more other features, integers, steps, operations, elements, components, and/or combination thereof. It should be appreciated that when we recite that an element is "connected" or "coupled" to another element, it may be directly connected or coupled to another element, or there may be an intermediate element. In addition, "connected" or "coupled" as used herein may include wireless connection or wireless coupling. The wording "and/or" as used herein covers all or any of one or more associated items as listed and any combination thereof.

Those skilled in the art could appreciate that, unless defined otherwise, all terms used herein, including technical and scientific terms, have the same meaning as commonly understood by those skilled in the art to which the present invention pertains. It should be further appreciated that such terms as those defined in a general dictionary are to be interpreted to have the meanings equal to the contextual meanings in the prior art, and are not to be interpreted to have ideal or excessively formal meanings unless specifically defined herein.

Those skilled in the art could appreciate that the term "terminal" and "terminal device" as used herein include both a device with a wireless signal receiver having no capability of transmission, and a device with reception and transmission hardware capable of bi-directional communication on a bi-directional communication link Such a device may include: a cellular or other communication device having a single line display or a multi-line display or having no multi-line display; a PCS (Personal Communications Service) that can combine voice, data processing, facsimile and/or data communication capability; a PDA (Personal Digital Assistant) that may include a radio frequency receiver, a pager, an Internet/Intranet access, a web browser, a notepad, a calendar, and/or a GPS (Global Positioning System) receiver; a conventional lap top and/or palmtop computer or other device having and/or including a radio frequency receiver. The term "terminal" or "terminal device" as used herein may be portable, transportable, installed in transportation (by air, sea and/or land), or adapted and/or configured to run locally and/or run in a distributed form at any other location of the earth and/or space. Furthermore, the term "terminal" and "terminal device" used herein maybe a communication terminal, a network terminal, or a music/video play terminal, such as a PDA, a MID (Mobile Internet Device), and/or a mobile phone with a music/video play function, and may also be a device such as a smart TV, a set-top box and the like.

Embodiment 1

The embodiment of the present invention provides a method of V2X communications, as shown in FIG. 1.

In step 101, the UE receives the configuration signaling transmitted by the eNB. The configuration signaling comprises at least one of an index $n_c$ corresponding to the carrier C configured with Mode 3 resource pool, a carrier SC for transmission of downlink control information S-DCI_C used for scheduling sidelink transmission on the carrier C, and maximum index value $n_{CI\_m}$ corresponding to the carrier C, wherein Mode 3 refers to the V2X resource allocation mode based on eNB scheduling.

For the embodiment of the present invention, the configuration of the resource pool using Mode 3 includes carrier frequency at which the resource pool using Mode 3 is located, a subframe set included in the resource pool, physical resource block(s) (PRB) set, and the like. Wherein any carrier C configured with a resource pool for Mode3 corresponds to a unique index $n_c$. Preferably, if the carrier C is the transmission carrier of the above configuration signaling, $n_c=0$; otherwise, $n_c$ may be equal to the order of the carrier C in the configuration signaling.

For example, if the carrier C is the first element of the signaling v2x-InterFreqInfoList-r14 defined in the current 3GPP standard 36.331 V14.0.0, $n_c=1$, and the values of n, are determined so on.

In step 102, the UE determines, according to the configuration signaling, at least one of a search space corresponding to S-DCI_C, the transmission carrier of S-DCI_C, and the number of bits corresponding to S-DCI_C.

In step 103, the UE detects S-DCI_C according to at least one of the search space corresponding to S-DCI_C, the transmission carrier of S-DCI_C, and the number of bits corresponding to S-DCI_C.

The embodiment of the present invention provides a method of V2X communications. Compared with the prior art, the embodiment of the present invention can determine, by receiving the configuration signaling transmitted by the eNB, at least one of a search space corresponding to S-DCI_C, the transmission carrier of S-DCI_C and the number of bits corresponding to S-DCI_C according to the configuration signaling, and can detect S-DCI_C according to at least one of the search space corresponding to S-DCI_C, the transmission carrier of S-DCI_C, and the number of bits corresponding to S-DCI_C. That is, the search space of S-DCI_C can be determined, or it can be ensured that the number of bits of S-DCI_C is equal to the number of bits of any other DCI mapped to the search space, so that S-DCI_C can be detected from the corresponding search space and then the number of times of blind detection in the UE downlink control channel can be reduced.

Embodiment 2

There is another possible embodiment of the present invention on the basis of embodiment 1, wherein step 102 of the UE determining, according to the configuration signaling, at least one of a search space corresponding to S-DCI_C, the transmission carrier of S-DCI_C and the number of bits corresponding to S-DCI_C comprises at least one of steps 202-204 as follows in embodiment 2, and wherein the operations in steps 201 and 205 are similar to those in steps 101 and 103, respectively, and are not repeated herein.

In step 202, the UE determines that the transmission carrier SC of S-DCI_C is the same as the transmission carrier of the configuration signaling.

In step 203, the UE determines the search space corresponding to S-DCI_C based on $n_c$ and/or $n_{CI\_m}$.

For the embodiment of the present invention, the UE may determine the search space corresponding to S-DCI_C based on $n_c$; the UE may also determine the search space corresponding to S-DCI_C by $n_c$ and $n_{CI\_m}$; and the UE may also determine the search space corresponding to S-DCI_C by $n_{CI\_m}$.

In step 204, the UE determines the number of bits of S-DCI_C as specific value based on the number of subchannels of the carrier C and the bandwidth of the transmission carrier of S-DCI_C.

In the embodiment of the present invention, for configuration of the resource pool for Mode 3 on any carrier C, the number of bits of S-DCI_C is equal to a specific value.

For example, the specific value may be equal to the number of bits of TDD DCI format 0 with a bandwidth of 5 MHz defined by 3GPP Rel-8, or equal to the number of bits of DCI format 0, corresponding to SC duplex mode (FDD or TDD), with a bandwidth of 5 MHz defined by 3GPP Rel-8, or equal to the number of bits of TDD DCI format 0, having CIF field, with a bandwidth of 3 MHz defined by 3GPP Rel-10, or equal to the number of bits of DCI format 0, having CIF field and corresponding to SC duplex mode (FDD or TDD), with a bandwidth of 3 MHz defined by 3GPP Rel-10, wherein, if the SC duplex mode is FDD, the number of bits is equal to 24, and if the SC duplex mode is TDD, the number of bits is equal to 26.

Embodiment 3

There is another possible embodiment of the present invention on the basis of embodiment 2, wherein step 203 of the UE determining the search space corresponding to S-DCI_C based on $n_c$ and/or $n_{CI\_m}$ comprises steps 303-304 as follows in embodiment 3, and wherein the operations in steps 301-302 and 305-306 are similar to those in steps 201-202 and 204-205, respectively, and are not repeated herein.

In step 303, the UE determines, based on $n_c$ and/or $n_{CI\_m}$, at least one PDCCH that may contain the SDCI_C, and control channel elements (CCEs) of each PDCCH.

In step 304, the UE determines, based on $n_c$ and/or $n_{CI\_m}$, at least one EPDCCH that may contain the SDCI_C, and enhanced control channel elements (ECCEs) of each EPDCCH.

For the embodiment of the present invention, step 303 and step 304 may be performed simultaneously, or step 303 may be performed before step 304, or step 304 may be performed before step 303, which is not defined herein.

Embodiment 4

There is another possible embodiment of the present invention on the basis of embodiment 3, wherein step 303 of the UE determining, based on $n_c$ and/or $n_{CI\_m}$, at least one PDCCH that may contain the SDCI_C, and control channel elements (CCEs) of each PDCCH comprises at least one of steps 403a, 403b and 403c as follows in embodiment 4, wherein step 304 of the UE determining, based on $n_c$ and/or $n_{CI\_m}$, at least one EPDCCH that may contain the SDCI_C, and enhanced control channel elements (ECCEs) of each EPDCCH comprises at least one of steps 404a, 404b and 404c as follows in embodiment 4, and wherein the operations in steps 401-402 and 405-406 are similar to those in steps 301-302 and 305-306, respectively, and are not repeated herein.

In step 403a, the UE determines at least one PDCCH that may contain the SDCI_C, and control channel elements (CCEs) of each PDCCH based on current slot number, the number of CCEs for PDCCH transmission in each subframe where PDCCH containing S-DCI_C may reside, the number of PDCCHs containing S-DCI_C, a radio network temporary identity (RNTI) configured for the UE, aggregation level of PDCCH scarrying S-DCI_C, and $n_c$.

For the embodiment of the present invention, on the carrier transmitting S-DCI_C, for any aggregation level L of PDCCHs carrying S-DCI_C, where $L \in \{1, 2, 4, 8\}$, the UE detects $M^{(L)}$PDCCHs possibly containing S-DCI_C, wherein the mth PDCCH contains the CCE determined by the following formula:

$$L\{(Y_k + m + M^{(L)} \cdot m_C) \bmod \lfloor N_{CCE,k}/L \rfloor\} + i$$

where $Y_k = (A \cdot Y_{k-1}) \bmod D$, $Y_{-1} = n_{RNTI} \neq 0$, $A=39827$, $D=65537$, $k = \lfloor n_s/2 \rfloor$, $n_s$ is current slot number, the value of $n_{RNTI}$ is a certain RNTI configured for the UE and, for example, may be C-RNTI of the UE, $i=0, \ldots, L-1$, $m=0, \ldots, M^{(L)}-1$, and $N_{CCE,k}$ represents the number of all CCEs for PDCCH transmission in subframe k.

In step 403b, the UE determines at least one PDCCH that may contain the SDCI_C, and CCEs of each PDCCH based on current slot number, the number of CCEs for PDCCH transmission in each subframe where PDCCH containing S-DCI_C may reside, the number of PDCCHs containing S-DCI_C, a RNTI configured for the UE, aggregation level of PDCCHs carrying S-DCI_C, and $n_{CI\_m}$.

For the embodiment of the present invention, on SC, for any aggregation level L of PDCCHs of S-DCI_C, where $L \in \{1, 2, 4, 8\}$, the UE detects $M^{(L)}$PDCCHs possibly containing S-DCI_C, wherein the mth PDCCH contains the CCE determined by the following formula:

$$L\{(Y_k + m + M^{(L)} \cdot n_{CI\_m}) \bmod \lfloor N_{CCE,k}L \rfloor\} + i$$

where, if the current UE operates in the carrier aggregation mode, $n_{CI\_m}$ represents the maximum value of the scheduled carrier index, with SC as the scheduling carrier, configured for the current UE, and may be 32, or the value of $n_{CI\_m}$ is configured by the eNB or defined by a standard; otherwise, $n_{CI\_m}=1$.

In step 403c, the UE determines at least one PDCCH that may contain the SDCI_C, and CCEs of each PDCCH based on current slot number, the number of CCEs for PDCCH transmission in each subframe where PDCCH containing S-DCI_C may reside, the number of PDCCHs containing S-DCI_C, a RNTI configured for the UE, aggregation level of PDCCHs carrying S-DCI_C, $n_c$ and $n_{CI\_m}$.

For the embodiment of the present invention, on the carrier transmitting S-DCI_C, for any aggregation level L of PDCCHs of S-DCI_C, where $L \in \{1, 2, 4, 8\}$, the UE detects $M^{(L)}$PDCCHs possibly containing S-DCI_C, wherein the mth PDCCH contains the CCE determined by the following formula:

$$L\{(Y_k + m + M^{(L)} \cdot n_C + M^{(L)} \cdot n_{CI\_m}) \bmod \lfloor N_{CCE,k}/L \rfloor\} + i$$

where, if the current UE operates in the carrier aggregation mode, $n_{CI\_m}$ represents the maximum value of the scheduled carrier index, with SC as the scheduling carrier, configured for the current UE, or is 32, or the value of $n_{CI\_m}$ is configured by the eNB or defined by a standard; otherwise, $n_{CI\_m}=1$.

In step 404a, the UE determines ECCEs of each EPDCCH of at least one EPDCCH possibly containing S-DCI_C based on current slot number, the number of EPDCCHs containing S-DCI_C, a RNTI configured for the UE, aggregation level of EPDCCHs carrying S-DCI_C, and $n_c$.

For the embodiment of the present invention, on the carrier transmitting S-DCI_C, for any aggregation level $\tilde{L}$ in an EPDCCH resource block set p, where $\tilde{L} \in \{1, 2, 4, 8, 16, 32\}$, the UE detects $\tilde{M}_p^{(\tilde{L})}$ EPDCCHs possibly containing S-DCI_C, wherein the mth EPDCCH contains the ECCE determined by the following formula:

$$\tilde{L}\left\{\left(Y_{p,k} + \left\lfloor \frac{m \cdot N_{ECCE,p,k}}{\tilde{L} \cdot \tilde{M}_p^{(L)}} \right\rfloor + n_C \right) \bmod \lfloor N_{ECCE,p,k}/\tilde{L} \rfloor \right\} + i$$

where $Y_{p,k} = (A_p \cdot Y_{p,k-1}) \bmod D$, $Y_{p,-1} = n_{RNTI} \neq 0$, $A_0 = 39827$, $A_1 = 39829$, $D = 65537$, $k = \lfloor n_s/2 \rfloor$, $n_s$ is current slot number, the value of $n_{RNTI}$ is a certain RNTI configured for the UE and, for example, may be C-RNTI of the UE, $i = 0, \ldots, \tilde{L}-1$, $m = 0, \ldots, \tilde{M}_p^{(L)}-1$, the value of $\tilde{M}_p^{(L)}$ is defined by a standard, and $n_{ECCE,p,k}$ represents the number of all ECCEs for transmitting EPDCCH of the EPDCCH resource block set p in subframe k and may be determined according to relevant signaling of the eNB.

In step 404b, the UE determines ECCEs of each EPDCCH of at least one EPDCCH possibly containing S-DCI_C based on current slot number, the number of EPDCCHs containing S-DCI_C, a RNTI configured for the UE, aggregation level of EPDCCHs carrying S-DCI_C, and $n_{CI\_m}$.

For the embodiment of the present invention, on SC, for any aggregation level $\tilde{L}$ in an EPDCCH resource block set p, where $\tilde{L} \in \{1, 2, 4, 8, 16, 32\}$, the UE detects EPDCCHs possibly containing S-DCI_C, wherein the mth EPDCCH contains the ECCE determined by the following formula:

$$\tilde{L}\left\{\left(Y_{p,k} + \left\lfloor \frac{m \cdot N_{ECCE,p,k}}{\tilde{L} \cdot \tilde{M}_p^{(L)}} \right\rfloor + n_{CI\_m} \right) \bmod \lfloor N_{ECCE,p,k}/\tilde{L} \rfloor \right\} + i$$

where, if the current UE operates in the carrier aggregation mode, $\tilde{n}_{CI\_m}$ represents the maximum value of the scheduled carrier index, with SC as the scheduling carrier, configured for the current UE, or is 32, or is obtained by the eNB configuration or by standard definition; otherwise, $\tilde{n}_{CI\_m} = 1$. Or, $\tilde{n}_{CI\_m} = 32$.

In step 404c, the UE determines ECCEs of each EPDCCH of at least one EPDCCH possibly containing S-DCI_C based on current slot number, the number of EPDCCHs containing S-DCI_C, a RNTI configured for the UE, aggregation level of EPDCCHs carrying S-DCI_C, nc and $n_{CI\_m}$.

For the embodiment of the present invention, on SC, for any aggregation level $\tilde{L}$ in an EPDCCH resource block set p, where $\tilde{L} \in \{1, 2, 4, 8, 16, 32\}$, the UE detects $\tilde{M}_p^{(L)}$ EPDCCHs possibly containing S-DCI_C, wherein the mth EPDCCH contains the ECCE determined by the following formula:

$$\tilde{L}\left\{\left(Y_{p,k} + \left\lfloor \frac{m \cdot N_{ECCE,p,k}}{\tilde{L} \cdot \tilde{M}_p^{(L)}} \right\rfloor + n_C + \tilde{n}_{CI\_m} \right) \bmod \lfloor N_{ECCE,p,k}/\tilde{L} \rfloor \right\} + i$$

where, if the current UE operates in the carrier aggregation mode, $\tilde{n}_{CI\_m}$ represents the maximum value of the scheduled carrier index, with SC as the scheduling carrier, configured for the current UE, or is 32, or the value of $\tilde{n}_{CI\_m}$ is obtained by the eNB configuration or by standard definition; otherwise, $\tilde{n}_{CI\_m} = 1$.

Embodiment 5

There is another possible embodiment of the present invention on the basis of embodiment 1, wherein the method further comprises step 501 as follows in embodiment 5.

In step 501, if S-DCI_C scrambled by sidelink SPSRNTI is detected and the carrier carrying S-DCI_C satisfies at least one of the preset conditions, the UE determines that the number of bits of the SPS configuration index field in S-DCI_C is 2 bits, wherein the preset conditions comprises at least one of: the transmission carrier SC of S-DCI_C is a frequency division duplex (FDD) carrier with a bandwidth of 1.4 MHz; and the number of subchannels of the resource pool, for current UE Mode 3 operation, on the carrier C is 20.

For the embodiment of the present invention, when the UE determines that the number of bits of the SPS configuration index field in S-DCI_C is 2 bits, the number of carriers, configured for the UE, of Mode3 resource pool containing 20subchannels should be no more than 3, and n, corresponding to these carriers should also be no more than 3.

For the embodiment of the present invention, if S-DCI_C scrambled by sidelink SPS RNTI is detected and the carrier carrying S-DCI_C satisfies at least one of the above preset conditions, the UE determines that the number of bits corresponding to the SPS configuration index field in S-DCI_C is 3 bits.

Embodiment 6

The embodiment of the present invention further provides another method of V2X communications, as shown in FIG. 2.

In step 601, the UE determines power control parameter according to configuration signaling transmitted by the eNB or preconfiguration signaling, wherein the power control parameter comprises at least one of open-loop power control parameter, and the maximum transmit power corresponding to the congestion level of current resource pool and the priority of data to be transmitted.

In step 602, the UE adjusts the transmit power of Physical Sidelink Control CHannel (PSCCH) and the transmit power of Physical Sidelink Shared CHannel (PSSCH) according to the power control parameter.

For the embodiment of the present invention, the UE may first determine whether the physical resource block(s) (PRB) occupied by the PSCCH are immediately followed by the PRB occupied by the PSSCH and then adjust the transmit power of the PSCCH and the transmit power of the PSSCH according to the determination result and the power control parameter, or the UE may directly adjust the transmit power of the PSCCH and the transmit power of the PSSCH according to the power control parameter. This is not defined in the embodiment of the present invention.

The embodiment of the present invention provides another method of V2X communications. Compared with the prior art, the embodiment of the present invention determines power control parameter according to configuration signaling transmitted by the eNB or preconfiguration signaling, and adjusts the transmit power of the PSCCH and the transmit power of the PSSCH according to the power control parameter, wherein the power control parameter comprises at least one of open-loop power control parameter, and the maximum transmit power corresponding to the congestion level of current resource pool and the priority of data to be transmitted. That is, the above embodiment can adjust the transmit power according to current congestion level and open-loop power. That is, the control parameter used to adjust the transmit power can simultaneously satisfy the current congestion level and the uplink control, so that it can be ensured that the adjusted transmit power simultaneously meets the uplink control and uplink interference control requirements.

Embodiment 7

There is another possible embodiment of the present invention on the basis of embodiment 6, wherein step 602 of the UE adjusting the transmit power of the PSCCH and the transmit power of the PSSCH according to the power control parameter comprises steps 702-703 as follows in embodiment 7, and wherein the operation in step 701 is similar to that in step 601 and not repeated herein.

In step 702, if the PRBs occupied by the PSCCH are immediately followed by the PRB occupied by the PSSCH, the UE determines the adjusted transmit power of the PSCCH according to the number of the PRBs occupied by the PSCCH, the number of the PRBs occupied by the PSSCH, basic open-loop power of the PSCCH in current resource allocation mode of the UE, compensation for path loss of the PSCCH transmit power in current resource allocation mode of the UE, path loss of the UE relative to the eNB, and the maximum transmit power corresponding to the resource pool congestion level and the priority of data to be transmitted.

For the embodiment of the present invention, if the PRBs occupied by the PSCCH are immediately followed by the PRB occupied by the PSSCH, the UE determines the adjusted transmit power of the PSCCH according to the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\left\{P_{CMAX\_CBR\_PPPP_j}, 10\log_{10}\left(M_{PSSCH} + 10^{\frac{3}{10}} \times M_{PSCCH}\right) + P_{O\_PSCCH,1} + \alpha_{PSCCH,1} \cdot PL\right\}[dBm],$$

where $M_{PSCCH}$ represents the number of PRBs for PSCCH transmission; $M_{PSSCH}$ represents the number of PRBs for PSSCH transmission scheduled by the PSCCH; l=3 if the current UE operates in Mode 3, and l=4 if the current UE operates in Mode4; $P_{O\_PSCCH,1}$ represents basic open-loop power (in dBm) of the PSCCH in Mode 1, and $\alpha_{PSCCH,1}$ represents compensation for path loss of the PSCCH transmit power in Mode 1, wherein the UE determines the values of $P_{O\_PSCCH,1}$ and $\alpha_{PSCCH,1}$ by the eNB configuration signaling or preconfiguration; PL represents path loss of the UE relative to the eNB; $CBR_i$ represents the CBR range corresponding to congestion level of current transmit resource pool of the UE, wherein the UE determines the value of current CBR by measuring the congestion level or receiving the eNB signaling, the UE determines the CBR range configuration by receiving the eNB signaling or preconfiguration, and i∈{0, 1, ..., 15}; $PPPP_j$ represents the value of the priority field in the PSCCH, or the highest priority of one or more packets transmitted in the PSSCH scheduled by the PSCCH, wherein j∈{0, 1, ..., 7}; $P_{CMAX\_CBR_i\ PPPP_j}$ represents the maximum transmit power (in dBm), configured by the eNB or preconfigured, for the CBR range $CBR_i$ and the priority $PPPP_j$.

In step 703, if the PRBs occupied by the PSCCH are immediately followed by the PRB occupied by the PSSCH, the UE determines the adjusted transmit power of the PSSCH according to the number of the PRBs occupied by the PSCCH, the number of the PRBs occupied by the PSSCH scheduled by the PSCCH, basic open-loop power of the PSSCH in current resource allocation mode of the UE, compensation for path loss of the PSSCH transmit power in current resource allocation mode of the UE, path loss of the UE relative to the eNB, and the maximum transmit power corresponding to the congestion level of current resource pool and the priority of the PSSCH.

For the embodiment of the present invention, the UE determines the adjusted transmit power of the PSSCH according to the following formula:

$$P_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX\_CBR_i\_PPPP_j}, 10\log_{10}\left(M_{PSSCH} + 10^{\frac{3}{10}} \times M_{PSCCH}\right) + P_{O\_PSSCH,1} + \alpha_{PSSCH,1} \cdot PL\right\}[dBm],$$

where $M_{PSCCH}$ represents the number of PRBs for PSCCH transmission; $M_{PSSCH}$ represents the number of PRBs for PSSCH transmission scheduled by the PSCCH; l=3 if the current UE operates in Mode 3, and l=4 if the current UE operates in Mode 4; $P_{O\_PSSCH,1}$ represents basic open-loop power (in dBm) of the PSSCH in Mode 1, and $\alpha_{PSSCH,1}$ represents compensation for path loss of the PSSCH transmit power in Mode 1, wherein the UE determines the values of $P_{O\_PSSCH,1}$ and $\alpha_{PSSCH,1}$ by the eNB configuration signaling or preconfiguration; PL represents path loss of the UE relative to the eNB; $CBR_i$ represents the CBR range corresponding to congestion level of the UE current transmit resource pool, wherein the UE determines the value of current CBR by measuring the congestion level or receiving the eNB signaling, the UE determines the CBR range configuration by receiving the eNB signaling or preconfiguration, and i∈{0, 1, ..., 15}; $PPPP_j$ represents the value of the priority field in the PSCCH, or the highest priority of one or more packets transmitted in the PSSCH scheduled by the PSCCH, wherein j∈{0, 1, ..., 7}; $P_{CMAX\_CBR_i\ PPPP_j}$ represents the maximum transmit power (in dBm), configured by the eNB or preconfigured, for the CBR range $CBR_i$ and the priority $PPPP_j$.

Embodiment 8

There is another possible embodiment of the present invention on the basis of embodiment 6, wherein step 602 of the UE adjusting the transmit power of the PSCCH and the transmit power of the PSSCH according to the power control parameter comprises steps 802-803 as follows in embodiment 8, and wherein the operation in step 801 is similar to that in step 601 and not repeated herein.

In step 802, if the PRBs occupied by the PSCCH are immediately followed the PRBs occupied by the PSSCH, the UE determines a first adjustment parameter and a second adjustment parameter.

For the embodiment of the present invention, the first adjustment parameter may be the same as the second adjustment parameter or different from the second adjustment parameter. This is not defined in the embodiment of the present invention.

In step 803, the UE adjusts the transmit power of the PSCCH according to the first adjustment parameter and adjusts the transmit power of the PSSCH according to the second adjustment parameter, so that the sum of the adjusted transmit power of the PSCCH and the adjusted transmit power of the PSSCH is not greater than the maximum transmit power corresponding to the congestion level of current resource pool and the priority of the data transmission.

For the embodiment of the present invention, when the first adjustment parameter is the same as the second adjustment parameter, the adjustment is according to the following formula:

$$P_{PSCCH} = \alpha_{c2} \cdot \tilde{P}_{PSCCH};$$

$$P_{PSSCH} = \alpha_{s2} \cdot \tilde{P}_{PSSCH};$$

where $\alpha_{c2}$ is the first adjustment parameter, $\alpha_{s2}$ is the second adjustment parameter, $0 \leq \alpha_{c2}, \alpha_{s2} \leq 1$ or $0 < \alpha_{c2}, \alpha_{s2} \leq 1$, $\tilde{P}_{PSCCH}$ is the linear value of the transmit power $\tilde{P}'_{PSCCH}$ of the PSCCH before the adjustment, and $\tilde{P}'_{PSSCH}$ is the linear value of the transmit power $\tilde{P}'_{PSSCH}$ of the PSSCH before the adjustment, wherein $$\tilde{P}'_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSCCH,i} + \alpha_{PSCCH,i} \cdot PL\right\}[dBm],$$

$$\tilde{P}'_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX}, 10\log_{10}\left(M_{PSSCH} + 10^{\frac{3}{10}} \times M_{PSCCH}\right) + P_{O\_PSCCH,i} + \alpha_{PSCCH,i} \cdot PL\right\}[dBm];$$

$P_{CMAX}$ represents the maximum power (in dBm) for the V2X transmission allowed by the UE in the current subframe, and the UE determines the value of $P_{CMAX}$ by receiving the eNB configuration signaling, preconfiguration, or standard definition; the UE determines the values of $\alpha_{c2}$ and $\alpha_{s2}$, so that the determined values satisfy the condition that $P_{PSCCH} + P_{PSSCH}$ is not greater than the linear value of $P_{CMAX\_CBR_i\_PPPP_j}$, where $P_{CMAX\_CBR_i\_PPPP_j}$ represents the maximum transmit power (in dBm), configured by the eNB or preconfigured, for the CBR range $CBR_i$ and the priority $PPPP_j$, and $\alpha_{c2}$ may be equal to $\alpha_{s2}$.

For the embodiment of the present invention, the UE may first determine whether or not the unadjusted transmit power of the PSCCH and the unadjusted transmit power of the PSSCH satisfy the condition $\tilde{P}'_{PSCCH} + \tilde{P}'_{PSSCH} \leq P_{CMAX\_CBR_i\_PPPP_j}$; if the condition is satisfied, the transmit power $P_{PSCCH}$ of the PSCCH and the transmit power $P_{PSSCH}$ of the PSSCH for the UE will not be adjusted, i.e. $P_{PSCCH} = \tilde{P}_{PSCCH}$ and $P_{PSSCH} = \tilde{P}_{PSSCH}$; if the condition is not satisfied, the UE determines the adjusted transmit power of the PSCCH and the adjusted transmit power of the PSSCH according to the following formula: $P_{PSCCH} = \alpha_{c3} \cdot \tilde{P}_{PSCCH}$, $P_{PSSCH} = \alpha_{s3} \cdot \tilde{P}_{PSSCH}$, where $\alpha_{c3}$ and $\alpha_{s3}$ may represent the first adjustment parameter and the second adjustment parameter, respectively, $0 \leq \alpha_{c3}, \alpha_{s3} < 1$ or $0 < \alpha_{c3}, \alpha_{s3} < 1$, the values of $\alpha_{c3}$ and $\alpha_{s3}$ should be determined by the UE so that $P_{PSCCH} + P_{PSSCH}$ is not greater than the linear value of $P_{CMAX\_CBR_i\_PPPP_j}$, and $\alpha_{c3}$ may be equal to $\alpha_{s3}$.

For the embodiment of the present invention, the UE may adjust only the transmit power of the PSSCH with the transmit power of the PSCCH unadjusted, that is, the first adjustment parameter is 1. Then, the adjusted transmit power of the PSCCH and the adjusted transmit power of the PSSCH are determined according to the following formula:

$$P_{PSCCH} = \tilde{P}_{PSCCH},$$

$$P_{PSSCH} = \alpha_4 \cdot \tilde{P}_{PSSCH},$$

where $\alpha_4$ may represent the second adjustment parameter, $0 \leq \alpha_4 \leq 1$ or $0 < \alpha_4 \leq 1$, and the value of $\alpha_4$ should be determined by the UE so that $P_{PSCCH} + P_{PSSCH}$ is not greater than the linear value of $P_{CMAX\_CBR_i\_PPPP_j}$.

For the embodiment of the present invention, the UE may first determine whether or not the unadjusted transmit power of the PSCCH and the unadjusted transmit power of the PSSCH satisfy the condition $\tilde{P}'_{PSCCH} + \tilde{P}'_{PSSCH} \leq P_{CMAX\_CBR_i\_PPPP_j}$; if the condition is satisfied, the transmit power of the PSCCH and the transmit power of the PSSCH will not be adjusted, i.e. $P_{PSCCH} = \tilde{P}_{PSCCH}$ and $P_{PSSCH} = \tilde{P}_{PSSCH}$; if the condition is not satisfied, the UE may adjust only the transmit power of the PSSCH, that is, the first adjustment parameter is determined as 1, where $\alpha_5$ may represent the second adjustment parameter, $0 \leq \alpha_5 \leq 1$ or $0 < \alpha_5 < 1$, and the value of $\alpha_5$ should be determined so that $P_{PSCCH} + P_{PSSCH}$ is not greater than the linear value of $P_{CMAX\_CBR_i\_PPPP_j}$.

Embodiment 9

There is another possible embodiment of the present invention on the basis of embodiment 6, wherein step 602 of the UE adjusting the transmit power of the PSCCH and the transmit power of the PSSCH according to the power control parameter comprises steps 902-903 as follows in embodiment 9, and wherein the operation in step 901 is similar to that in step 601 and not repeated herein.

In step 902, if the PRBs occupied by the PSCCH are not immediately followed by the PRB occupied by the PSSCH, the UE determines the adjusted transmit power of the PSCCH according to the number of the PRBs occupied by the PSCCH, the number of the PRBs occupied by the PSSCH scheduled by the PSCCH, basic open-loop power of the PSCCH in current resource allocation mode of the UE, compensation for path loss of the PSCCH transmit power in current resource allocation mode of the UE, path loss of the UE relative to the eNB, and the maximum transmit power in a first CBR range and the data priority field.

Herein, the first CBR range is the CBR range corresponding to the greater congestion level among the congestion level of the UE current PSCCH transmission resource pool and the congestion level of the UE current PSSCH transmission resource pool, or is the greater CBR range among the CBR range corresponding to the congestion level of the UE current PSCCH transmission resource pool and the CBR range corresponding to the congestion level of the UE current PSSCH transmission resource pool, or is the CBR range corresponding to the congestion level of the UE current PSCCH transmission resource pool, or is the CBR range corresponding to the congestion level of the UE current PSCCH transmission resource pool, or is the CBR range corresponding to the average congestion level of the congestion level of the UE current PSCCH transmission resource pool and the congestion level of the UE current PSSCH transmission resource pool.

For the embodiment of the present invention, if the PRBs occupied by the PSCCH are not immediately followed by the PRB occupied by the PSSCH, the UE determines the adjusted transmit power of the PSCCH according to the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\left\{P_{CMAX\_CBR_i^{PSCCH}\_PPPP_j}, 10\log_{10}\left(M_{PSSCH} + 10^{\frac{3}{10}} \times M_{PSCCH}\right) + P_{O\_PSCCH,l} + \alpha_{PSCCH,l} \cdot PL\right\}[dBm]$$

where $M_{PSCCH}$ represents the number of PRBs for PSCCH transmission; $M_{PSSCH}$ represents the number of PRBs for PSSCH transmission scheduled by the PSCCH; l=3 if the current UE operates in Mode 3, and l=4 if the current UE operates in Mode 4; the UE determines the values of $P_{O\_PSCCH,1}$ and $a_{O\_PSCCH,1}$ by the eNB configuration signaling or preconfiguration, wherein $P_{O\_PSCCH,1}$ represents basic open-loop power (in dBm) of the PSCCH in Mode 1, and $\alpha_{O\_PSCCH,1}$ represents compensation for path loss of the PSCCH transmit power in Mode 1; PL represents path loss of the UE relative to the eNB; $CBR'_i$ represents the CBR range corresponding to the greater congestion level among the congestion level of the UE current PSCCH transmission resource pool and the congestion level of the UE current PSSCH transmission resource pool, or represents the CBR range corresponding to the congestion level of the UE current PSCCH transmission resource pool, or the CBR range corresponding to the congestion level of the UE current PSSCH transmission resource pool, or the CBR range corresponding to the average of the congestion level of the UE current PSCCH transmission resource pool and the congestion level of the UE current PSSCH transmission resource pool, wherein the UE determines the CBR values of the current PSCCH transmission resource pool and PSSCH transmission resource pool by measuring the congestion level or receiving the eNB signaling, the UE determines the CBR range configuration by receiving the eNB signaling or preconfiguration, and i∈{0, 1, . . . , 15}; $PPPP_j$ represents the value of the priority field in the PSCCH, or the highest priority of one or more packets transmitted in the PSSCH scheduled by the PSCCH, wherein j∈{0, 1, . . . , 7}; $P_{CMAX\_CBR'_i\_PPPP_j}$ represents the maximum transmit power (in dBm), configured by the eNB or preconfigured, for the CBR range $CBR'_i$ and the priority $PPPP_j$.

In step 903, if the PRBs occupied by the PSCCH are not immediately followed the PRBs occupied by the PSSCH, the UE determines the adjusted transmit power of the PSSCH according to the number of the PRBs occupied by the PSCCH, the number of the PRBs occupied by the PSSCH scheduled by the PSCCH, basic open-loop power of the PSSCH in current resource allocation mode of the UE, compensation for path loss of the PSSCH transmit power in current resource allocation mode of the UE, path loss of the UE relative to the eNB, and the maximum transmit power for the priority of the PSSCH in the first CBR range.

For the embodiment of the present invention, if the PRBs occupied by the PSCCH are not immediately followed by the PRB occupied by the PSSCH, the UE determines the adjusted transmit power of the PSSCH according to the following formula:

$$P_{PSSCH} = 10\log_{10}\left(\frac{M_{PSSCH}}{M_{PSSCH} + 10^{\frac{3}{10}} \times M_{PSCCH}}\right) +$$

$$\min\left\{P_{CMAX\_CBR_i^{PSCCH}\_PPPP_j}, 10\log_{10}\left(M_{PSSCH} + 10^{\frac{3}{10}} \times M_{PSCCH}\right) + P_{O\_PSCCH,l} + \alpha_{PSCCH,l} \cdot PL\right\}[dBm]$$

where $P_{O\_PSSCH,1}$ represents basic open-loop power (in dBm) of the PSSCH in Mode 1, and $\alpha_{O\_PSSCH,1}$ represents compensation for path loss of the PSSCH transmit power in Mode 1.

Embodiment 10

There is another possible embodiment of the present invention on the basis of embodiment 6, wherein step 602 of the UE adjusting the transmit power of the PSCCH and the transmit power of the PSSCH according to the power control parameter comprises steps 1002-1003 as follows in embodiment 10, and wherein the operation in step 1001 is similar to that in step 601 and not repeated herein.

In step 1002, if the PRBs occupied by the PSCCH are not immediately followed by the PRB occupied by the PSSCH, the UE determines the adjusted transmit power of the PSCCH according to the number of the PRBs occupied by the PSCCH, the number of the PRBs occupied by the PSSCH scheduled by the PSCCH, basic open-loop power of the PSCCH in current resource allocation mode of the UE, compensation for path loss of the PSCCH transmit power in current resource allocation mode of the UE, path loss of the UE relative to the eNB, and the maximum transmit power, for the priority of the PSSCH scheduled by the PSCCH, in a second CBR range, wherein the second CBR range is the CBR range corresponding to the congestion level of the UE current PSCCH transmission resource pool.

For the embodiment of the present invention, if the PRBs occupied by the PSCCH are not immediately followed by the PRB occupied by the PSSCH, the UE may determine the adjusted transmit power of the PSCCH according to the following formula:

$$P_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$

$$\min\left\{P_{CMAX\_CBR_i^{PSCCH}\_PPPP_j}, 10\log_{10}\left(M_{PSSCH} + 10^{\frac{3}{10}} \times M_{PSCCH}\right) + P_{O\_PSCCH,l} + \alpha_{PSCCH,l} \cdot PL\right\}[dBm]$$

where $CBR_i^{PSSCH}$ represents the CBR range corresponding to the congestion level of the UE current PSCCH transmission resource pool, wherein the UE determines the CBR value of the current PSCCH transmission resource pool by measuring the congestion level or receiving the eNB signaling, the UE determines the CBR range configuration by receiving the eNB signaling or preconfiguration, and i∈{0, 1, . . . , 15}; $P_{CMAX\_CBR_i^{PSCCH}\_PPPP_j}$ represents the maximum transmit power (in dBm), configured by the eNB or preconfigured, for the CBR range $CBR_i^{PSSCH}$ and the priority $PPPP_j$.

In step 1003, if the PRBs occupied by the PSCCH are not immediately followed by the PRB occupied by the PSSCH, the UE determines the adjusted transmit power of the PSSCH according to the number of the PRBs occupied by the PSCCH, the number of the PRBs occupied by the PSSCH scheduled by the PSCCH, basic open-loop power of the PSSCH in current resource allocation mode of the UE, compensation for path loss of the PSSCH transmit power in current resource allocation mode of the UE, path loss of the UE relative to the eNB, and the maximum transmit power for the priority of the PSSCH in a third CBR range, wherein the third CBR range is the CBR range corresponding to the congestion level of the UE current PSSCH transmission resource pool.

For the embodiment of the present invention, if the PRBs occupied by the PSCCH are not immediately followed by the PRB occupied by the PSSCH, the UE may determine the adjusted transmit power of the PSSCH according to the following formula:

$$P_{PSSCH} = 10\log_{10}\left(\frac{M_{PSSCH}}{M_{PSSCH}+10^{\frac{3}{10}} \times M_{PSCCH}}\right) +$$
$$\min\left\{P_{CMAX\_CBR_i^{PSCCH}\_PPPP_j}, 10\log_{10}\left(M_{PSSCH}+10^{\frac{3}{10}} \times M_{PSCCH}\right) + P_{O\_PSCCH,i} + \alpha_{PSCCH,i} \cdot PL\right\} [dBm]$$

where $CBR_i^{PSSCH}$ represents the CBR range corresponding to the congestion level of the UE current PSSCH transmission resource pool, wherein the UE determines the CBR value of the current PSSCH transmission resource pool by measuring the congestion level or receiving the eNB signaling, the UE determines the CBR range configuration by receiving the eNB signaling or preconfiguration, and $i \in \{0, 1, \ldots, 15\}$; $P_{CMAX\_CBR_i^{PSCCH}\_PPPP_j}$ represents the maximum transmit power (in dBm), configured by the eNB or preconfigured, for the CBR range $CBR_i^{PSSCH}$ and the priority $PPPP_j$.

Embodiment 11

There is another possible embodiment of the present invention on the basis of embodiment 6, wherein step 602 of the UE adjusting the transmit power of the PSCCH and the transmit power of the PSSCH according to the power control parameter comprises steps 1102-1103 as follows in embodiment 11, and wherein the operation in step 1101 is similar to that in step 601 and not repeated herein.

In step 1102, if the PRBs occupied by the PSCCH are not immediately followed by the PRB occupied by the PSSCH, the UE determines a third adjustment parameter and a fourth adjustment parameter.

For the embodiment of the present invention, the third adjustment parameter may be the same as the fourth adjustment parameter or different from the fourth adjustment parameter. This is not defined herein.

In step 1103, the UE adjusts the transmit power of the PSCCH according to the third adjustment parameter and adjusts the transmit power of the PSSCH according to the fourth adjustment parameter, so that the sum of the adjusted transmit power of the PSCCH and the adjusted transmit power of the PSSCH is not greater than the maximum transmit power for the priority of the PSSCH in the first CBR range.

For the embodiment of the present invention, if the third adjustment parameter is the same as the fourth adjustment parameter, the UE may adjust the transmit power of the PSCCH and the transmit power of the PSSCH according to the following formula:

$P_{PSCCH} = \alpha'_{c3} \cdot \tilde{P}_{PSCCH}$, $P_{PSSCH} = \alpha'_{s3} \cdot \tilde{P}_{PSSCH}$, where $\tilde{P}_{PSCCH}$ is the linear value of the unadjusted transmit power $\tilde{P}'_{PSCCH}$ of the PSCCH, and $\tilde{P}_{PSSCH}$ is the linear value of the unadjusted transmit power $\tilde{P}'_{PSSCH}$ of the PSSCH, wherein $$\tilde{P}'_{PSCCH} = 10\log_{10}\left(\frac{10^{\frac{3}{10}} \times M_{PSCCH}}{M_{PSSCH}+10^{\frac{3}{10}} \times M_{PSCCH}}\right) +$$
$$\min\left\{P_{CMAX}, 10\log_{10}\left(M_{PSSCH}+10^{\frac{3}{10}} \times M_{PSCCH}\right) + P_{O\_PSCCH,i} + \alpha_{PSCCH,i} \cdot PL\right\} [dBm],$$

$$\tilde{P}'_{PSSCH} = 10\log_{10}\left(\frac{M_{PSSCH}}{M_{PSSCH}+10^{\frac{3}{10}} \times M_{PSCCH}}\right) +$$
$$\min\left\{P_{CMAX}, 10\log_{10}\left(M_{PSSCH}+10^{\frac{3}{10}} \times M_{PSCCH}\right) + P_{O\_PSCCH,i} + \alpha_{PSCCH,i} \cdot PL\right\} [dBm];$$

where $\alpha'_{c3}$ and $\alpha'_{s3}$ may represent the third adjustment parameter and the fourth adjustment parameter, respectively, $0 \le \alpha'_{c3}, \alpha'_{s3} \le 1$ or $0 < \alpha'_{c3}, \alpha'_{s3} \le 1$, $P_{CMAX}$ represents the maximum power (in dBm) for the V2X transmission allowed by the UE in the current subframe, and the UE determines the value of $P_{CMAX}$ by receiving the eNB configuration signaling, preconfiguration, or standard definition. In the embodiment of the present invention, the values of $\alpha'_{c3}$ and $\alpha'_{s3}$ should be determined by the UE so that $P_{PSCCH} + P_{PSSCH}$ is not greater than the linear value of $P_{CMAX\_CBR'_l}\_PPPP_j$, and $\alpha'_{c3}$ may be equal to $\alpha'_{s3}$.

For the embodiment of the present invention, before adjusting the transmit power of the PSCCH and the transmit power of the PSSCH, the UE may first determine whether or not the unadjusted transmit power of the PSCCH and the unadjusted transmit power of the PSSCH satisfy $\tilde{P}'_{PSCCH} + \tilde{P}'_{PSSCH} \le P_{CMAX\_CBR'_l}\_PPPP_j$; if the condition is satisfied, the transmit power of the PSCCH and the transmit power of the PSSCH will not be adjusted, i.e. $P_{PSCCH} = \tilde{P}_{PSCCH}$ and $P_{PSSCH} = \tilde{P}_{PSSCH}$; if the condition is not satisfied, the UE determines the adjusted transmit power of the PSCCH and the adjusted transmit power of the PSSCH according to the following formula: $P_{PSCCH} = \alpha'_{c4} \cdot \tilde{P}_{PSCCH}$ and $P_{PSSCH} = \alpha'_{s4} \cdot \tilde{P}_{PSSCH}$, where $0 \le \alpha'_{c4}, \alpha'_{s4} < 1$ or $0 = \alpha'_{c4}, \alpha'_{s4} < 1$. In the embodiment of the present invention, $\alpha'_{c4}$ and $\alpha'_{s4}$ are determined by the UE so that $P_{PSCCH} + P_{PSSCH}$ is not greater than the linear value of $P_{CMAX\_CBR'_l}\_PPPP_j$, and $\alpha'_{c4}$ may be equal to $\alpha'_{s4}$.

For the embodiment of the present invention, the UE may adjust only the transmit power of the PSSCH, that is, the third adjustment parameter is 1. Then, the adjusted transmit power of the PSCCH and the adjusted transmit power of the PSSCH are determined according to the following formula:

$P_{PSCCH} = \tilde{P}_{PSCCH}$, $P_{PSSCH} = \alpha'_5 \cdot \tilde{P}_{PSSCH}$, where $\alpha'_5$ may represent the fourth adjustment parameter, $0 \le \alpha'_5 \le 1$ or $0 < \alpha'_5 \le 1$, and $\alpha'_5$ should be determined so that $P_{PSCCH} + P_{PSSCH}$ is not greater than the linear value of $P_{CMAX\_CBR'_l}\_PPPP_j$.

For the embodiment of the present invention, before adjusting the transmit power of the PSCCH and the transmit power of the PSSCH, the UE may first determine whether or not the unadjusted transmit power of the PSCCH and the unadjusted transmit power of the PSSCH satisfy $\tilde{P}'_{PSCCH} +$ $\tilde{P}'_{PSSCH} \le P_{CMAX\_CBR'_i}\_PPPP_j$; if the condition is satisfied, the transmit power of the PSCCH and the transmit power of the PSSCH will not be adjusted, i.e. $P_{PSCCH}=\tilde{P}_{PSCCH}$ and $P_{PSSCH}=\tilde{P}_{PSSCH}$; if the condition is not satisfied, the UE may adjust only the transmit power of the PSSCH with the transmit power of the PSCCH unadjusted, i.e. $P_{PSCCH}=\tilde{P}_{PSCCH}$ and $P_{PSSCH}=\alpha'_6 \cdot \tilde{P}_{PSSCH}$, where $0 \le \alpha'_6 < 1$ or $0 < \alpha'_6 < 1$, and the value of $\alpha'_6$ should be determined by the UE so that $P_{PSCCH}+P_{PSSCH}$ is not greater than the linear value of $P_{CMAX\_CBR'_i}\_PPPP_j$.

Embodiment 12

There is another possible embodiment of the present invention on the basis of embodiment 6, wherein step 602 of the UE adjusting the transmit power of the PSCCH and the transmit power of the PSSCH according to the power control parameter comprises steps 1202-1203 as follows in embodiment 12, and wherein the operation in step 1201 is similar to that in step 601 and not repeated herein.

In step 1202, if the PRBs occupied by the PSCCH are not immediately followed by the PRB occupied by the PSSCH, the UE determines a fifth adjustment parameter corresponding to the PSCCH and a sixth adjustment parameter corresponding to the PSSCH.

In step 1203, the UE adjusts the transmit power of the PSCCH by the fifth adjustment parameter so that the adjusted transmit power of the PSCCH is not greater than a first preset value, and adjusts the transmit power of the PSSCH by the sixth adjustment parameter so that the adjusted transmit power of the PSSCH is not greater than a second preset value.

For the embodiment of the present invention, if the PRBs occupied by the PSCCH are not immediately followed the PRBs occupied by the PSSCH, the UE adjusts the transmit power of the PSCCH according to the fifth adjustment parameter and adjusts the transmit power of the PSSCH according to the sixth adjustment parameter, i.e. $P_{PSCCH}=\alpha'_{c7} \cdot \tilde{P}_{PSCCH}$ and $P_{PSSCH}=\alpha'_{s7} \cdot \tilde{P}_{PSSCH}$, where $\tilde{P}_{PSCCH}$ is the linear value of the transmit power $\tilde{P}'_{PSCCH}$ of the PSCCH before the adjustment, and $\tilde{P}_{PSSCH}$ is the linear value of the transmit power $\tilde{P}'_{PSSCH}$ of the PSSCH before the adjustment, wherein $$\tilde{P}'_{PSCCH} = 10\log_{10}\left(\frac{10^{\frac{3}{10}} \times M_{PSCCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSCCH,i} + \alpha_{PSCCH,i} \cdot PL\right\} [dBm],$$

$$\tilde{P}'_{PSSCH} = 10\log_{10}\left(\frac{M_{PSSCH}}{M_{PSSCH} + 10^{\frac{3}{10}} \times M_{PSCCH}}\right) +$$
$$\min\left\{P_{CMAX}, 10\log_{10}\left(M_{PSSCH} + 10^{\frac{3}{10}} \times M_{PSCCH}\right) + P_{O\_PSSCH,i} + \alpha_{PSSCH,i} \cdot PL\right\} [dBm],$$

where $P_{CMAX}$ represents the maximum power (in dBm) for the V2X transmission allowed by the UE in the current subframe, and the UE determines the value of $P_{CMAX}$ by receiving the eNB configuration signaling, preconfiguration, or standard definition. In the embodiment of the present invention, the fifth adjustment parameter $\alpha'_{c7}$ and the sixth adjustment parameter $\alpha'_{s7}$ satisfy the following relationship:

$0 \le \alpha'_{c7}, \alpha'_{s7} \le 1$ or $0 < \alpha'_{c7}, \alpha'_{s7} \le 1$, the fifth adjustment parameter $\alpha'_{c7}$ should be determined by the UE so that $P_{PSCCH}$ is not greater than the linear value of $$10\log_{10}\left(\frac{10^{\frac{3}{10}} \times M_{PSCCH}}{M_{PSSCH} + 10^{\frac{3}{10}} \times M_{PSCCH}}\right) + P_{CMAX\_CBR_i^{PSCCH}}\_PPPP_j,$$

and the sixth adjustment parameter $\alpha'_{s7}$ should be determined by the UE so that $P_{PSSCH}$ is not greater than the linear value of $$10\log_{10}\left(\frac{M_{PSSCH}}{M_{PSSCH} + 10^{\frac{3}{10}} \times M_{PSCCH}}\right) + P_{CMAX\_CBR_i^{PSSCH}}\_PPPP_j,$$

where $P_{CMAX\_CBR_i^{PSCCH}}\_PPPP_j$ represents the maximum transmit power (in dBm), configured by the eNB or preconfigured, for the CBR range $CBR_i^{PSCCH}$ and the priority $PPPP_j$, and $P_{CMAX\_CBR_i^{PSSCH}}\_PPPP_j$ represents the maximum transmit power (in dBm), configured by the eNB or preconfigured, for the CBR range $CBR_i^{PSSCH}$ and the priority $PPPP_j$.

For the embodiment of the present invention, the UE may predetermine whether or not the transmit power of the current transmit PSCCH and the transmit power of the transmit PSSCH satisfy $$\tilde{P}'_{PSCCH} \le 10\log_{10}\left(\frac{10^{\frac{3}{10}} \times M_{PSCCH}}{M_{PSSCH} + 10^{\frac{3}{10}} \times M_{PSCCH}}\right) + P_{CMAX\_CBR_i^{PSCCH}}\_PPPP_j$$

and $$\tilde{P}'_{PSSCH} \le 10\log_{10}\left(\frac{M_{PSSCH}}{M_{PSSCH} + 10^{\frac{3}{10}} \times M_{PSCCH}}\right) + P_{CMAX\_CBR_i^{PSSCH}}\_PPPP_j;$$

if the condition is satisfied, the transmit power of the PSCCH and the transmit power of the PSSCH will not be adjusted, i.e. $P_{PSCCH}=\tilde{P}_{PSCCH}$ and $P_{PSSCH}=\tilde{P}_{PSSCH}$; if the condition is not satisfied, it is necessary to adjust the transmit power of the PSCCH by an adjustment parameter $\alpha'_{c8}$ and adjust the transmit power of the PSSCH by an adjustment parameter $\alpha'_{s8}$, where $0 \le \alpha_{c8}, \alpha'_{s8} < 1$ or $0 < \alpha_{c8}, \alpha'_{s8} < 1$, the value of $\alpha'_{c8}$ should be determined by the UE so that $P_{PSCCH}$ is not greater than the linear value of $$10\log_{10}\left(\frac{M_{PSCCH}}{M_{PSSCH} + 10^{\frac{3}{10}} \times M_{PSCCH}}\right) + P_{CMAX\_CBR_i^{PSCCH}}\_PPPP_j,$$

and the value of $\alpha'_{s8}$ should be determined by the UE so that $P_{PSSCH}$ is not greater than the linear value of $$10\log_{10}\left(\frac{M_{PSSCH}}{M_{PSSCH} + 10^{\frac{3}{10}} \times M_{PSCCH}}\right) + P_{CMAX\_CBR_i^{PSSCH}}\_PPPP_j.$$

Embodiment 13

The embodiment of the present invention provides a further method of V2X communications, as shown in FIG. 3.

In step 1301, a first UE determines, by the eNB configuration signaling or preconfiguration signaling, at least one optional time position information for transmitting a Side Link Synchronization Signal (SLSS) and a Physical Sidelink Broadcast CHannel (PSBCH), wherein the configuration signaling or preconfiguration signaling includes at least one of a first sync offset indication value syncOffsetIndicator-v1, a second sync offset indication value syncOffsetIndicator-v2, and a third sync offset indication value syncOffsetIndicator-v3.

For the embodiment of the present invention, if the first UE is within the coverage of the cellular network, the first UE may determine, according to the eNB configuration, one or more optional time-frequency resource positions for transmitting the SLSS and the PSBCH; if the first UE is out of the coverage of the cellular network, the first UE may determine, according to the preconfiguration, one or more optional time-frequency resource positions for transmitting the SLSS and the PSBCH. In the embodiment of the present invention, based on whether the type of the detected synchronization signal transmitted by a reference synchronization source is GNSS synchronization signal, the Primary Synchronization Signal (PSS) and the Secondary Synchronization Signal (SSS) in the Long Term Evolution (LTE) system, or the SLSS, the first UE can correspondingly determine whether the reference synchronization source is GNSS, eNB, or UE; if the reference synchronization source is a UE, the first UE may determine the type of the reference synchronization source based on the SLSS ID transmitted by the reference synchronization source, the PSBCH content transmitted by the reference synchronization source, and the position where the UE reference synchronization source transmits the SLSS and the PSBCH.

In step 1302, based on the coverage state about whether the first UE is within the cellular network coverage, the first UE determines, according to the type of the reference synchronization source, time position information from the at least one optional time position information for transmitting the SLSS and the PSBCH, the identity information of the SLSS to be transmitted, and the value of the inCoverage field in the PSBCH to be transmitted.

For the embodiment of the present invention, a UE within the cellular network coverage may be represented by ICUE, and a UE out of the cellular network coverage may be represented by OOCUE. Herein, the ICUE obtains corresponding information about transmission of the SLSS according to the configuration signaling of the eNB, and transmits the corresponding information of the SLSS with the eNB or GNSS as the reference synchronization source; if OOCUE, the OOCUE obtains corresponding information about transmission of the SLSS according to preconfiguration, and the first UE may transmit the SLSS and the PSBCH with other UEs transmitting the SLSS or GNSS as the reference synchronization source.

The embodiment of the present invention provides a further method of V2X communications. Compared with the prior art, the embodiment of the present invention determines, by the eNB configuration signaling or preconfiguration signaling, at least one optional time position information for transmitting the SLSS and the PSBCH and the type of the reference synchronization source, and can determine, according to the type of the reference synchronization source, specific time position information from the at least one optional time position information for transmitting the SLSS and the PSBCH, the identity information of the SLSS to be transmitted, and the value of the inCoverage field in the PSBCH to be transmitted. That is, the specific time position information for the SLSS and the PSBCH to be transmitted, the identity information of the SLSS to be transmitted and the value of the inCoverage field in the PSBCH to be transmitted can be determined according to the cellular network state information and the type of the reference synchronization source, thereby avoiding interference between a UE, which is within the cellular network cell coverage and capable of accurately receiving a GNSS signal, and a UE, which is out of the cellular network cell and capable of accurately receiving a GNSS synchronization signal, or UEs using the two UEs as reference synchronization sources, so that the PSBCH could be successfully detected.

Embodiment 14

There is another possible embodiment of the present invention on the basis of embodiment 14, wherein step 1302 in which, based on the coverage state about whether the first UE is within the cellular network coverage, the first UE determines, according to the type of the reference synchronization source, time position information from the at least one optional time position information for transmitting the SLSS and the PSBCH, the identity information of the SLSS to be transmitted, and the value of the inCoverage field in the PSBCH to be transmitted comprises step 1402 as follows in embodiment 14, and wherein the operation in step 1401 is similar to that in step 1301 and not repeated herein.

In step 1402, if the first UE is within the cellular network coverage and the type of the reference synchronization source is GNSS, the UE determines, based on syncOffsetIndicator-v1 and current system frame number, time position information for transmitting the SLSS information and the PSBCH information, the identity (ID) of the SLSS to be transmitted as 0, and the value of the inCoverage field in the PSBCH to be transmitted as TRUE, wherein the current system frame number is determined by the first UE according to the received time information of GNSS.

For the embodiment of the present invention, for an ICUE and with GNSS as the synchronization source, the subframe position where the first UE transmits the SLSS synchronization signal satisfies(10*G-SFN+sn) mod 160=syncOffsetIndicator-v1, wherein the first UE determines the value of syncOffsetIndicator-v1 by preconfiguration or receiving the eNB signaling, preferably, 0≤syncOffsetIndicator-v1<160, and wherein G-SFN represents the current system frame number determined by the UE according to the GNSS timing, at this point the SLSS ID used by the first UE should be 0 and the value of the inCoverage field in the PSBCH to be transmitted is set as TRUE.

For the embodiment of the present invention, the frequency domain position where the SLSS is transmitted is at n PRBs at the current carrier center, where n is an indication value defined by a standard, e.g., n=6.

Embodiment 15

There is another possible embodiment of the present invention on the basis of embodiment 13, wherein step 1302 in which, based on the coverage state about whether the first UE is within the cellular network coverage, the first UE determines, according to the type of the reference synchronization source, time position information from the at least one optional time position information for transmitting the SLSS and the PSBCH, the identity information of the SLSS to be transmitted, and the value of the inCoverage field in the PSBCH to be transmitted comprises step 1502 as follows in embodiment 15, and wherein the operation in step 1501 is similar to that in step 1301 and not repeated herein.

In step 1502, if the first UE is not within the cellular network coverage, uses GNSS as the reference synchronization source and cannot receive the PSBCH information transmitted by the second UE, the first UE determines, based on syncOffsetIndicator-v3 and current system frame number, time position information for transmitting the SLSS information and the PSBCH information, the ID of the SLSS to be transmitted as 1, and the value of the inCoverage field in the PSBCH to be transmitted as TRUE, wherein the second UE is within the cellular network coverage and uses GNSS as the reference synchronization source.

Herein, for an OOCUE and with GNSS as the synchronization source, in the case that the first UE cannot read the PSBCH transmitted by an ICUE with GNSS as the synchronization source, the subframe position where the first UE transmits the SLSS synchronization signal satisfies(10*G-SFN+sn) mod 160=syncOffsetIndicator-v3, wherein the first UE determines the value of syncOffsetIndicator-v3 by preconfiguration, preferably, 0≤syncOffsetIndicator-v3<160, and syncOffsetIndicator-v3 is not equal to syncOffsetIndicator-v1, and wherein G-SFN represents the current system frame number determined by the UE according to the GNSS timing. At this point, the SLSS ID used by the UE should be 0 and the inCoverage field is set as FALSE; or the SLSS ID used by the UE should belong to {1, 167}, e.g., 1, and the inCoverage field is set as TRUE.

For the embodiment of the present invention, the frequency domain position where the SLSS is transmitted is at n PRBs at the current carrier center, where n is an indication value defined by a standard, e.g., n=6.

Embodiment 16

There is another possible embodiment of the present invention on the basis of embodiment 13, wherein step 1302 in which, based on the coverage state about whether the first UE is within the cellular network coverage, the first UE determines, according to the type of the reference synchronization source, time position information for transmitting the SLSS and the PSBCH, the identity information of the SLSS to be transmitted, and the value of the inCoverage field in the PSBCH to be transmitted, from the at least one optional time position information for transmitting the SLSS and the PSBCH comprises step 1602 as follows in embodiment 16, and wherein the operation in step 1601 is similar to that in step 1301 and not repeated herein.

In step 1602, if the first UE is not within the cellular network coverage, uses GNSS as the reference synchronization source and can receive the PSBCH information transmitted by the second UE, the first UE determines, based on syncOffsetIndicator-v2 and current system frame number, time position information for transmitting the SLSS information and the PSBCH information, the ID of the SLSS to be transmitted as 0 or 1, and the value of the inCoverage field in the PSBCH to be transmitted as FALSE.

For the embodiment of the present invention, if the first UE is not within the cellular network coverage, uses GNSS as the reference synchronization source and can read the PSBCH transmitted by an ICUE with GNSS as the synchronization source, the subframe position where the first UE transmits the SLSS synchronization signal satisfies(10*G-SFN+sn) mod 160=syncOffsetIndicator-v2. Herein, a UE that is not within the cellular network coverage and uses GNSS as the reference synchronization source may be represented by OOCUE1.

Herein, the first UE determines the value of syncOffsetIndicator-v2 by preconfiguration, preferably, 0≤syncOffsetIndicator-v2<160, syncOffsetIndicator-v2 is not equal to syncOffsetIndicator-v1 and syncOffsetIndicator-v3, and at this point the SLSS ID used by the first UE should be 0 or 1 and the inCoverage field is set as FALSE.

For the embodiment of the present invention, the frequency domain position where the SLSS is transmitted is at n PRBs at the current carrier center, where n is an indication value defined by a standard, e.g., n=6.

Embodiment 17

There is another possible embodiment of the present invention on the basis of embodiment 13, wherein step 1302 in which, based on the coverage state about whether the first UE is within the cellular network coverage, the first UE determines, according to the type of the reference synchronization source, time position information for transmitting the SLSS and the PSBCH, the identity information of the SLSS to be transmitted, and the value of the inCoverage field in the PSBCH to be transmitted, from the at least one optional time position information for transmitting the SLSS and the PSBCH comprises step 1702 as follows in embodiment 17, and wherein the operation in step 1701 is similar to that in step 1301 and not repeated herein.

In step 1702, if the first UE is not within the cellular network coverage and uses the second UE as the reference synchronization source, the first UE determines, based on syncOffsetIndicator-v2 and current system frame number, time position information for transmitting the SLSS information and the PSBCH information, the ID of the SLSS to be transmitted as 0, and the value of the inCoverage field in the PSBCH to be transmitted as FALSE.

For the embodiment of the present invention, for an OOCUE and in the case that an ICUE with GNSS as the synchronization source is used as the synchronization source, the subframe position where the first UE transmits the SLSS synchronization signal satisfies(10*G-SFN+sn) mod 160=syncOffsetIndicator-v2. Herein, a UE that is out of the cellular network coverage and uses an ICUE, with GNSS as the synchronization source, as the synchronization source is represented by OOCUE2.

Herein, the first UE determines the value of syncOffsetIndicator-v2 by preconfiguration, preferably, 0≤syncOffsetIndicator-v2<160, syncOffsetIndicator-v2 is not equal to syncOffsetIndicator-v1 and syncOffsetIndicator-v3. Herein, G-SFN represents the current system frame number determined by the UE according to the GNSS timing, and at this point the SLSS ID used by the first UE should be 0 and the inCoverage field is set as FALSE.

For the embodiment of the present invention, the frequency domain position where the SLSS is transmitted is at n PRBs at the current carrier center, where n is an indication value defined by a standard, e.g., n=6.

Embodiment 18

There is another possible embodiment of the present invention on the basis of embodiment 13, wherein step 1302 in which, based on the coverage state about whether the first UE is within the cellular network coverage, the first UE determines, according to the type of the reference synchronization source, time position information for transmitting the SLSS and the PSBCH, the identity information of the SLSS to be transmitted, and the value of the inCoverage field in the PSBCH to be transmitted, from the at least one optional time position information for transmitting the SLSS and the PSBCH comprises step 1802 as follows in embodiment 18, and wherein the operation in step 1801 is similar to that in step 1301 and not repeated herein.

In step 1802, if the first UE is not within the cellular network coverage and uses the third UE as the reference synchronization source, the first UE determines, based on syncOffsetIndicator-v2 and current system frame number, time position information for transmitting the SLSS information and the PSBCH information, the ID of the SLSS to be transmitted as the ID of the SLSS transmitted by the third UE plus 168, or as any integer among [1, 167], or as any integer among [169, 503], and the value of the inCoverage field in the PSBCH to be transmitted as FALSE, wherein the third UE is not within the cellular network coverage and uses GNSS as the reference synchronization source.

For the embodiment of the present invention, for an OOCUE and with an OOCUE1 as the synchronization source, the subframe position where the first UE transmits the SLSS synchronization signal satisfies(10*G-SFN+sn) mod 160=syncOffsetIndicator-v2, wherein the first UE determines the value of syncOffsetIndicator-v2 by preconfiguration, preferably, 0≤syncOffsetIndicator-v2<160, and syncOffsetIndicator-v2 is not equal to syncOffsetIndicator-v1 and syncOffsetIndicator-v3, and wherein G-SFN represents the current system frame number determined by the UE according to the GNSS timing, and at this point the SLSS ID used by the first UE should be the SLSS ID of the synchronization source OOCUE1 plus 168, or a specific integer among [169, 335], e.g., 169 or 335, or an integer randomly selected among [169, 335], or a specific integer among [1, 167], e.g., 1, or an integer randomly selected among [1, 167], or a specific integer among [336, 503], e.g., 336, or an integer randomly selected among [336, 503], and the inCoverage field is set as FALSE.

For the embodiment of the present invention, the frequency domain position where the SLSS is transmitted is at n PRBs at the current carrier center, where n is an indication value defined by a standard, e.g., n=6.

Embodiment 19

There is another possible embodiment of the present invention on the basis of embodiment 13, wherein step 1302 in which, based on the coverage state about whether the first UE is within the cellular network coverage, the first UE determines, according to the type of the reference synchronization source, time position information for transmitting the SLSS and the PSBCH, the identity information of the SLSS to be transmitted, and the value of the inCoverage field in the PSBCH to be transmitted, from the at least one optional time position information for transmitting the SLSS and the PSBCH comprises step 1902 as follows in embodiment 19, and wherein the operation in step 1901 is similar to that in step 1301 and not repeated herein.

In step 1902, if the first UE is not within the cellular network coverage and uses the fourth UE as the reference synchronization source, the first UE determines, based on syncOffsetIndicator-v1 and current system frame number, time position information for transmitting the SLSS information and the PSBCH information, the ID of the SLSS to be transmitted as 168, and the value of the inCoverage field in the PSBCH to be transmitted as FALSE, wherein the fourth UE is not within the cellular network coverage and uses the second UE as the reference synchronization source.

For the embodiment of the present invention, for an OOCUE and with an OOCUE2 as the synchronization source, the subframe position where the first UE transmits the SLSS synchronization signal satisfies(10*G-SFN+sn) mod 160=syncOffsetIndicator-v1, wherein the first UE determines the value of syncOffsetIndicator-v1 by preconfiguration, and wherein G-SFN represents the current system frame number determined by the UE according to the GNSS timing, and at this point the SLSS ID used by the first UE should be 168 and the inCoverage field is set as FALSE.

For the embodiment of the present invention, the frequency domain position where the SLSS is transmitted is at n PRBs at the current carrier center, where n is an indication value defined by a standard, e.g., n=6.

For the embodiment of the present invention, it can be ensured by embodiments 13 to 19 that the IDs of the SLSS transmitted on the same transmission resource differ from each other. Since the different SLSS IDs correspond to orthogonal SLSS sequence and PSBCH demodulation reference signal sequence, it is possible to avoid interference between an ICUE with GNSS as the synchronization source and an OOCUE with GNSS as the synchronization source, and further avoid interference between a UE with a UE1 as the synchronization source and a UE with an OOCUE2 as the synchronization source. The inCoveragefield is set in a mode so as to ensure that the present scheme is consistent with the rules defined in the existing standards, reducing complexity of standardization and implementation.

The present invention provides a device for V2X communications, as shown in FIG. 4, the device comprising:

a first receiving module 2001 for receiving the configuration signaling transmitted by the eNB, wherein the configuration signaling comprises at least one of an index $n_c$ corresponding to the carrier C configured with Mode 3 resource pool, a carrier SC for transmission of downlink control information S-DCI_C used for scheduling sidelink transmission on the carrier C, and maximum index value $n_{CI\_m}$ corresponding to the carrier C;

a first determining module 2002 for determining, according to the configuration signaling, at least one of a search space corresponding to the S-DCI_C, the transmission carrier of the S-DCI_C, and the number of bits corresponding to the S-DCI_C; and a detection module 2003 for detecting the S-DCI_C according to at least one of the search space corresponding to the S-DCI_C, the transmission carrier of the S-DCI_C, and the number of bits corresponding to the S-DCI_C.

The embodiment of the present invention provides a device for V2X communications. Compared with the prior art, the embodiment of the present invention can determine, by receiving the configuration signaling transmitted by the eNB, at least one of a search space corresponding to S-DCI_C, the transmission carrier of S-DCI_C and the number of bits corresponding to S-DCI_C according to the configuration signaling, and can detect S-DCI_C according to at least one of the search space corresponding to S-DCI_C, the transmission carrier of S-DCI_C, and the number of bits corresponding to S-DCI_C. That is, the search space of S-DCI_C can be determined, or it can be ensured that the number of bits of S-DCI_C is equal to the number of bits of any other DCI mapped to the search space, so that S-DCI_C can be detected from the corresponding search space and then the number of times of blind detection in the UE downlink control channel can be reduced.

The device for V2X communications provided by the embodiment of the present invention can implement the above-described method embodiments, and the description in the method embodiments may be referred to for specific function implementation which is not repeated herein.

The embodiment of the present invention provides another device for V2X communications, as shown in FIG. 5, the device comprising:

a second determining module 2101 for determining power control parameter according to configuration signaling transmitted by the eNB or preconfiguration signaling, wherein the power control parameter comprises at least one of open-loop power control parameter, and the maximum transmit power corresponding to the congestion level of current resource pool and the priority of data transmission; and an adjusting module 2102 for adjusting the transmit power of a Physical Sidelink Control CHannel (PSCCH) and the transmit power of a Physical Sidelink Shared CHannel (PSSCH) according to the power control parameter.

The embodiment of the present invention provides another device for V2X communications. Compared with the prior art, the embodiment of the present invention determines power control parameter according to configuration signaling transmitted by the eNB or preconfiguration signaling, and adjusts the transmit power of the PSCCH and the transmit power of the PSSCH according to the power control parameter, wherein the power control parameter comprises at least one of open-loop power control parameter, and the maximum transmit power corresponding to the congestion level of current resource pool and the priority of data to be transmitted. That is, the above embodiment can adjust the transmit power according to current congestion level and open-loop power. That is, the control parameter for adjusting the transmit power can simultaneously satisfy the current congestion level and the uplink control, so that it can be ensured that the adjusted transmit power simultaneously satisfies the congestion control and uplink interference control requirements.

The device for V2X communications provided by the embodiment of the present invention can implement the above-described method embodiments, and the description in the method embodiments may be made reference for specific function implementation which is not repeated herein.

The present invention provides a further device for V2X communications, as shown in FIG. 6, the device comprising:

a third determining module 2201 for determining, by the eNB configuration signaling or preconfiguration signaling, at least one optional time position information for transmitting a Side Link Synchronization Signal (SLSS) and a Physical Sidelink Broadcast CHannel (PSBCH), wherein, based on the coverage state about whether a first UE is within the cellular network coverage, the third determining module 2201 further determines, according to the type of a reference synchronization source, time position information from the at least one optional time position information for transmitting the SLSS and the PSBCH, the identity information of the SLSS to be transmitted, and the value of the inCoverage field in the PSBCH to be transmitted.

The embodiment of the present invention provides a further device for V2X communications. Compared with the prior art, the embodiment of the present invention determines, by the eNB configuration signaling or preconfiguration signaling, at least one optional time position information for transmitting the SLSS and the PSBCH and the type of the reference synchronization source, and can determine, according to the type of the reference synchronization source, specific time position information from the at least one optional time position information for transmitting the SLSS and the PSBCH, the identity information of the SLSS to be transmitted, and the value of the inCoverage field in the PSBCH to be transmitted. That is, the specific time position information for the SLSS and the PSBCH to be transmitted, the identity information of the SLSS to be transmitted and the value of the inCoverage field in the PSBCH to be transmitted can be determined according to the cellular network state information and the type of the reference synchronization source, thereby avoiding interference between a UE, which is within the cellular network cell coverage and capable of accurately receiving a GNSS signal, and a UE, which is out of the cellular network cell and capable of accurately receiving a GNSS synchronization signal, or there is no interference between the UEs using the above two UEs as reference synchronization sources, so that the PSBCH could be successfully detected.

The device for V2X communications provided by the embodiment of the present invention can implement the above-described method embodiments, and the description in the method embodiments may be made reference for specific function implementation which is not repeated herein.

Embodiment 20

In order to increase the transmission rate of a second-type V2X UE, a higher modulation scheme (64 QAM) is introduced. In order to support the coexistence of a first-type V2X UE and a second-type V2X UE, it is required that the first-type V2X UE can take resources possibly occupied by the second-type V2X UE into consideration when selecting a transmission resource. One resource includes one or more successive subchannels, and one subchannel includes N successive Physical Resource Blocks (PRBs), where N is configured by a higher-layer signaling or preconfigured. An existing method for selecting a transmission resource including the following steps (referring to Section 14.1.1.6 in the TS 36.213).

Step 1: A first-type V2X UE determines the time-frequency resource location and priority of the scheduled PSSCH by receiving a PSCCH transmitted by other UEs.

The other UEs can be UEs of the same type or UEs of different types.

Step 2: The first-type V2X UE detects reference signal received power (referred to as Reference Signal Received Power of the PSSCH (PSSCH-RSRP) measurement) of the scheduled PSSCH, and excludes resources having PSSCH-RSRP greater than a specific threshold. For example, if the proportion of the remaining resources in the total resources within a resource selection window is less than 20%, the specific threshold is increased by 3 dB, and this step will be executed again until the proportion of the remaining resources is not less than 20%.

Step 3: The first-type V2X UE calculates a Sidelink-Received Signal Strength Indicator (S-RSSI) of the remaining resources, and randomly selects a resource as the transmission resource from part of resources having the lowest S-RSSI. For example, in an ascending order, resources are successively selected from the remaining resources until the proportion of all the selected resources in the total resources within the resource selection window is not less than 20%. Subsequently, a resource is randomly selected from the selected resources to serve as the transmission resource.

It is not hard to see from this method that, it is able to measure resources for the PSSCH indicated by the PSCCH and select a proper resource as the transmission resource only when the first-type V2X UE can correctly decode the PSCCH of the second-type V2X UE. However, the first-type V2X UE supports only the QPSK and 16 QAM modulation. In other words, when the first-type V2X UE receives a PSCCH from the second-type V2X UE (the bit information contained in PSCCH of the LTE Rel-14 is shown in Table 1), it reads an MCS bit field in the PSCCH and finds that the indicated modulation scheme is 64 QAM, that is, when $I_{MCS}>20$ in Table 2, behaviors of the UE are not defined in the prior art.

TABLE 1

(Referring to 3GPP TS 36.212 5.4.3.1.2)

| Name of bit field | Number of bits |
| --- | --- |
| Service priority | 3 bits |
| Resource reservation | 4 bits |
| Frequency-domain resource location for initial transmission and retransmission | $\lceil \log_2(N_{subchannel}^{SL}(N_{subchannel}^{SL}+1)/2) \rceil$ |
| Time interval between initial transmission and retransmission | 4 bits |
| Modulation and coding scheme | 5 bits (see Table 2) |
| Retransmission index | 1 bit |
| Reserved bit | X bits (the bit length of the SCI is equal to 32 bits) |

Table 2-1 and Table 2-2
(Referring to 3GPP TS 36213 8.6.1-1: Modulation, TBS index and redundancy version table for PUSCH)

TABLE 2-1

| MCS Index $I_{MCS}$ | Modulation Order $Q'_m$ | TBS Index $I_{TBS}$ | Redundancy Version $rv_{idx}$ |
| --- | --- | --- | --- |
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |

TABLE 2-2

| MCS Index $I_{MCS}$ | Modulation Order $Q'_m$ | TBS Index $I_{TBS}$ | Redundancy Version $rv_{idx}$ |
| --- | --- | --- | --- |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |

TABLE 2-2-continued

| MCS Index $I_{MCS}$ | Modulation Order $Q'_m$ | TBS Index $I_{TBS}$ | Redundancy Version $rv_{idx}$ |
| --- | --- | --- | --- |
| 27 | 6 | 25 | 0 |
| 28 | 6 | 26 | 0 |
| 29 | reserved | | 1 |
| 30 | | | 2 |
| 31 | | | 3 |

In this embodiment, in the above case, the first-type V2X UE can perform analysis by the following several implementations.

Way 1: When the first-type V2X UE selects a transmission resource and if $I_{MCS}$ indicated in the PSCCH from the other UEs is greater than 20, the first-type V2X UE executes the steps 1 to 3 according to the information of the PSCCH, but the first-type V2X UE may not try to decode the PSSCH scheduled by the PSCCH. The "not try to decode" in the present invention means "may skip decoding", that is, the first-type V2X UE may decode the PSSCH scheduled by the PSCCH or skip decoding the PSSCH scheduled by the PSCCH, similarly hereinafter.

Way 2: When the first-type V2X UE selects a transmission resource, if $I_{MCS}$ indicated in the PSCCH from the other UEs is greater than 20, and when the modulation scheme satisfies $Q'=\min(4, Q'_m)=4$ (where $Q'_m$ is a modulation scheme determined according to $Q'_m$ in Table 2) and the calculated effective channel coding rate is greater than a predefined threshold Thc, for example, when Thc=0.93, the first-type V2X UE executes the steps 1 to 3 according to the information of the PSCCH, but the first-type V2X UE may not try to decode the PSSCH scheduled by the PSCCH. However, when the modulation scheme satisfies $Q'=\min(4, Q'_m)=4$ and the calculated effective channel coding rate is less than or equal to the predefined threshold Thc, the first-type V2X UE executes the steps 1 to 3 according to the information of the PSCCH, and the first-type V2X UE tries to decode the PSSCH scheduled by the PSCCH.

Wherein, during the calculation of the effective channel coding rate, only one-time transmission is taken into consideration. Specifically, during the calculation of the effective channel coding rate, the TBS index $I_{TBS}$ is determined according to $I_{MCS}$ in Table 2, the TBS is determined according to Table 7.1.7.2.1-1 or 7.1.7.2.2-1 in 3GPP TS 36.213 and then added with a Cyclic Redundancy Check (CRC) to serve as a numerator for the calculation of the effective channel coding rate, and the number of physical channel bits of the PSSCH is used as a denominator for the calculation of the effective channel coding rate. For example, the number of physical channel bits of the PSSCH is calculated as follows: the number of allocated Resource Blocks (RBs) *the number of subcarriers of each RB*the number of available symbols (eight symbols)*the modulation order Q'.

Way 3: As another implementation of the way 2, when $20<I_{MCS}<29$, this method is performed described in accordance to the way 2. When $I_{MCS}\geq 29$, the first-type V2X UE can neither decode the PSSCH nor measure the PSSCH-RSRP. In this case, $I_{MCS}=29\sim31$ is also not used by the second-type V2X UE to indicate the MCS of the PSSCH.

Way 4: When the first-type V2X UE selects a transmission resource, if $I_{MCS}$ in the PSCCH from other UEs is greater than 20 and when the modulation scheme satisfies $Q'=\min(4, Q'_m)=4$ (wherein $Q'_m$ is a modulation scheme determined according to $I_{MCS}$ in Table 2), the first-type V2X UE further decides the number of expectedly received PSSCHs scheduled by the PSCCH, i.e., decides whether there is one transmission or two transmissions (for example, if the received PSCCH is transmitted initially and it is determined by the indication "time interval between initial transmission and retransmission in Table 2 that there is also one PSCCH retransmission, there are two transmissions), and then calculates the effective channel coding rate. For example, if there are two transmissions, the effective channel coding rate is jointly calculated based on the two transmissions. If the effective channel coding rate is greater than the predefined threshold Thc, for example, Thc=0.93, the first-type V2X UE executes the steps 1 to 3 according to the information of the PSCCH, and the first-type V2X UE may not try to decode the PSSCH scheduled by the PSCCH. However, when the modulation scheme satisfies $Q'=\min(4, Q'_m)=4$ and the calculated effective channel coding rate is less than or equal to the predefined threshold Thc, the first-type V2X UE executes the steps 1 to 3 according to the information of the PSCCH, and the first-type V2X UE tries to decode the PSSCH scheduled by the PSCCH.

It is to be noted that, in the three implementations, if the first-type V2X UE decides that the TBS exceeds the maximum UE capability (e.g., 31704) according to the received MCS information of the PSCCH, the first-type V2X UE executes the steps 1 to 3 according to the information of the PSCCH, but does not try to decode the PSSCH scheduled by the PSCCH.

Way 5: When the first-type V2X UE selects a transmission resource and if the value of the bit field indication "resource reservation" in the PSCCH from other UEs is greater than or equal to Thr_int, the first-type V2X UE executes the steps 1 to 3 according to the information of the PSCCH, but does not try to decode the PSSCH scheduled by the PSCCH. Wherein, in the step 2 and/or step 3, the first-type V2X UE measures PSSCH-RSRP based on the PSSCH scheduled by the PSCCH, but the result of measurement is not applied to subframes of other subsequently possibly transmitted PSSCHs.

In the existing V2X communication, a UE can reserve, by the bit field indication "resource reservation", resources of multiple subframes for subsequently possibly transmitted PSSCHs. That is, the UE indicates, by the current PSCCH, one or two PSSCH transmissions scheduled by the PSCCH, and can inform, by the PSCCH, other UEs of subsequent subframes in which this transmitting UE may transmit other PSSCHs. In the existing step 2 and/or step 3, the UE measures the PSSCH-RSRP of the PSSCH indicated by the PSCCH and the S-RSSI, and it is assumed that the RSRP/RSSI is the same in these reserved subframes. However, in the way 4, when the value of the bit field indication "resource reservation" is greater than or equal to Thr_int, the first-type V2X UE is unable to determine the location of the reserved subframes. Nevertheless, the first-type V2X UE can still measure the PSSCH-RSRP of the PSSCH indicated by the PSCCH and the S-RSSI, and will take the interference possibly caused by the PSSCH into consideration during the resource selection.

Preferably, Thr_int=13.

FIG. 1 shows a flowchart of a preferred method for receiving a PSCCH in V2X communication in this embodiment, comprising the following steps 2301 to 2303.

Step 2301: A UE detects a PSCCH in format of SCI X transmitted by other UEs.

Step 2302: The UE determines, according to modulation and coding indication information (i.e., an MCS bit field) of the SCI X, a modulation order of a PSSCH scheduled by the SCI X, and the UE determines, according to the SCI X, whether to measure PSSCH-RSRP of the PSSCH scheduled by the SCI X and/or an S-RSSI and selects a transmission resource according to the measured information.

Wherein, a first-type V2X UE executes by one of the above ways 1 to 5.

A second-type V2X UE determines whether to measure the PSSCH-RSRP of the PSSCH scheduled by the SCI X and/or the S-RSSI by one of the following ways 6 to 7.

Way 6: When the second-type V2X UE selects a transmission resource, if the effective channel coding rate of the PSSCH scheduled by the received PSCCH from other UEs is greater than the predefined threshold Thc, for example, when Thc=0.93 (the Thc can be defined as the effective channel coding rate of single transmission or can be defined as the effective channel coding rate determined according to the number of transmissions indicated by the received PSSCH), the second-type V2X UE executes the steps 1 to 3 according to the information of the PSCCH but may not try to decode the PSSCH scheduled by the received PSCCH.

Way 7: When the second-type V2X UE selects a transmission resource, if the effective channel coding rate of the PSSCH scheduled by the received PSCCH from other UEs is greater than the predefined threshold Thc, for example, when Thc=0.93, the second-type V2X UE may not execute the steps 1 to 3 according to the information of the PSCCH and may skip decoding the PSSCH scheduled by the received PSCCH.

When the second-type V2X UE determines that it is necessary to measure the PSSCH-RSRP of the PSSCH and/or the S-RSSI according to the detected PSCCH from other UEs by the above-described way 6 or 7 or by other ways, the transmission resource can be selected according to the measured information by one of the following ways.

Way 1: In the step 2, the UE performing transmission resource selection also needs to determine a threshold for the PSSCH-RSRP from other UEs according to the modulation scheme to be used by the UE performing transmission resource selection. It is to be noted that, in the step 2 of the prior art, the threshold for the PSSCH-RSRP is related to the priority of a V2X service. In the present invention, the modulation scheme is added on the basis of the existing factors influencing the threshold.

Preferably, when it is assumed that, the threshold for the PSSCH-RSRP is Thr_rsrp1 when the UE performing transmission resource selection uses the QPSK or 16 QAM modulation scheme, the threshold for the PSSCH-RSRP is Thr_rsrp2 when the UE performing transmission resource selection uses the 64 QAM modulation scheme. Wherein, the Thr_rsrp2 is less than or equal to the Thr_rsrp1, so that the data transmission based on 64 QAM can be further guaranteed. The Thr_rsrp2 can be configured by a higher-layer signaling or can be a value of Thr_rsrp1 defined by the standard. The Thr_rsrp2 has an offset Δ1 relative to Thr_rsrp1. For example, Thr_rsrp2=Thr_rsrp1 (dB)+Δ1. For example, Δ1 is equal to −3 (dB). Δ1 can be configured by a higher-layer signaling, preconfigured or predefined.

Way 2: In the step 2, after the UE performing transmission resource selection excludes the resources having PSSCH-RSRP greater than the specific threshold, the proportion of the remaining resources in the total resources within the resource selection window shall not be less than a specific threshold $Thr_{\_step2\_ratio}$. The specific threshold needs to be determined according to the modulation scheme to be used by the UE performing transmission resource selection.

Further, in the step 3, for the UE performing transmission resources, the proportion of said part of resources in the total resources within the resource selection window shall not be less than a specific threshold $Thr_{\_step3\_ratio}$ The specific threshold needs to be determined according to the modulation scheme to be used by the UE performing transmission resource selection.

Preferably, it is assumed that, when the UE performing transmission resource selection uses the QPSK or 16 QAM modulation scheme, the specific threshold $Thr\_step2\_ratio$ in the step 2 is equal to $Thr\_step2\_ratio1$ and the specific threshold $Thr\_step3\_ratio$ in the step 3 is equal to $Thr\_step3\_ratio1$. When the UE performing transmission resource selection uses the 64 QAM modulation scheme, the specific threshold $Thr\_step2\_ratio$ in the step 2 is equal to $Thr\_step2\_ratio2$, and the specific $Thr\_step3\_ratio$ in the step 3 is equal to $Thr\_step3\_ratio2$. For example, the $Thr\_step2\_ratio2$ is less than $Thr\_step2\_ratio1$, and the $Thr\_step3\_ratio2$ is less than the $Thr\_step3\_ratio1$, so that the interference level of resource candidates can be further reduced.

Preferably, the way 1 and way2 can be combined. For example, when the UE performing transmission resource selection uses the 64 QAM modulation scheme, the PSSCH-RSRP threshold Thr_rsrp and the $Thr\_step2\_ratio$ in the step 2 and the $Thr\_step3\_ratio$ in the step 3 are all less than the thresholds when the UE uses the QPSK or 16 QAM modulation scheme. Way 3: In the step 2, the UE performing transmission resource selection needs to determine, according to the modulation scheme indicated by the PSCCH received from other UEs, a threshold for the PSSCH-RSRP from the other UEs. Preferably, it is assumed that, the threshold for the PSSCH-RSRP is Thr_rsrp1 when the UE performing transmission resource selection uses the QPSK or 16 QAM modulation scheme, and the threshold for the PSSCH-RSRP is Thr_rsrp3 when the other UEs use the 64 QAM modulation scheme. Wherein, the Thr_rsrp3 is less than or equal to the Thr_rsrp1, so that the data transmission based on 64 QAM can be further guaranteed. Wherein, the Thr_rsrp3 can be configured by a higher-layer signaling or can be a value of Thr_rsrp1 defined by the standard. The Thr_rsrp3 has an offset Δ2 relative to Thr_rsrp1. For example, Thr_rsrp3=Thr_rsrp1 (dB)+Δ2. For example, Δ2 is equal to −3 (dB). Δ2 can be configured by a higher-layer signaling, preconfigured or predefined.

Preferably, the way 1 and way 3 can be combined. In the step 2, the UE performing transmission resource selection needs to determine, according to the adjustment scheme to be used by the UE performing transmission resource selection and the modulation scheme indicated by the PSCCH received from other UEs, a threshold for the PSSCH-RSRP from the other UEs. Preferably, it is assumed that, the threshold for the PSSCH-RSRP is Thr_rsrp1 when the UE performing transmission resource selection uses the QPSK or 16 QAM modulation scheme; and, in four cases corresponding to whether the UE performing transmission resource selection uses 64 QAM and whether the modulation scheme indicated by the received PSCCH from the other UEs is 64 QAM, the value of the threshold Thr_rsrp4 for the PSSCH-RSRP can be identical or different. Wherein, the Thr_rsrp4 is less than or equal to the Thr_rsrp1, so that the data transmission based on 64 QAM can be further guaranteed. The Thr_rsrp4 can be configured by a higher-layer signaling or can be a value of Thr_rsrp1 defined by the standard. The Thr_rsrp4 has an offset Δ3 relative to Thr_rsrp1. For example, Thr_rsrp4=Thr_rsrp1 (dB)+Δ3. For example, Δ3 is equal to −3 (dB). Δ3 can be configured by a higher-layer signaling, preconfigured or predefined.

Preferably, the ways 1, 2 and 3 can be combined.

By the above methods, the thresholds are determined according to the modulation scheme, so that it is advantageous to reduce the interference during the transmission of PSSCHs using 64 QAM.

The second-type V2X UE determines the modulation order by one of the following ways.

Way 1: The second-type V2X UE reads MCS indication information in the PSCCH from the other UEs, and determines a modulation scheme $Q'=Q'_m$ according to an MCS-TBS table.

Preferably, the MCS-TBS table is as shown in Table 2.

Preferably, in the MCS-TBS table, as shown in Table 2, $I_{MCS}=0\sim28$; correspondingly to $I_{MCS}=0\sim28$ in Table 2, $I_{MCS}=29\sim31$ is defined to support the modulation and coding scheme of 64 QAM or 256 QAM and the TBS index so as to support a higher modulation and coding rate.

Preferably, in the MCS-TBS table, $I_{MCS}=0\sim28$ is as shown in Table 2, and $I_{MCS}=29\sim31$ can be defined as the same modulation and coding scheme and TBS index as $I_{MCS}=21\sim23$ in Table 2, that is, three rows of $I_{MCS}=21\sim23$ in Table 2 are copied to $I_{MCS}=29\sim31$.

Preferably, in the MCS-TBS table, $I_{MCS}=0\sim20$ and $I_{MCS}=24\sim28$ are as shown in Table 2, and $I_{MCS}=21\sim23$ is defined as the same TBS index as $I_{MCS}=21\sim23$ in Table 2, but the modulation order is 4, i.e., 16 QAM. $I_{MCS}=29\sim31$ can be defined as the same modulation and coding scheme and TBS index as $I_{MCS}=21\sim23$ in Table 2, that is, the modulation order is 6 (64 QAM). Advantageously, the second-type V2X UE can realize the transmission of a large TB in a low-order modulation scheme (i.e., 16 QAM) by transmitting $I_{MCS}=21\sim23$. By transmitting the PSSCH for two times, the first-type V2X UE or the second-type V2X UE can decode the PSSCH. The first-type V2X UE determines the modulation scheme according to 16 QAM when it receives $I_{MCS}=21\sim23$. In this way, the SCI X transmitted by the second-type V2X UE has backward compatibility. If the second-type V2X UE wants to use a higher modulation scheme (e.g., 64 QAM) and the same TBS as the LTE system, the second-type V2X UE can transmit $I_{MCS}=29\sim31$. When the first-type V2X UE detects $I_{MCS}=29\sim31$, the first-type V2X UE will give up the decoding of the PSSCH.

Way 2: The second-type V2X UE reads MCS indication information in the PSCCH from the other UEs. In accordance with Table 2, when $I_{MCS}$ in the MCS indication information of the PSCCH is less than or equal to Th_mcs, the modulation scheme satisfies $Q'=\min(4, Q'_m)$; and, when $I_{MCS}>$Th_mcs, $Q'=Q'_m$. Wherein, the Th_mcs is predefined by the standard, for example, Th_mcs=23 or Th_mcs=24.

Way 3: If the second-type V2X UE can identify whether the received PSCCH is from the first-type V2X UE or the second-type V2X UE, and if the received PSCCH is from the second-type V2X UE, it is determined that the modulation scheme satisfies $Q'=Q'_m$ according to the Table 2 and the MCS indication information of the PSCCH; and, if the received PSCCH is from the first-type V2X UE, the modulation scheme satisfies $Q'=\min(4, Q'_m)$ when $I_{MCS}$ in the MCS indication information of the PSCCH is less than or equal to Th_mcs, and $Q'_m$ when $I_{MCS}>$Th_mcs. Wherein, the Th_mcs is predefined by the standard, for example, Th_mcs=24.

No limitation is given in this embodiment about how the UE identifies from which V2X UE the PSCCH is. For example, in the SCI transmitted by the second-type V2X UE, an MCS table can be indicated by one of the reserved bits, that is, the MCS table for the first-type V2X UE (table 2) or the new MCS table as shown above for the second-type V2X UE is used.

Step 2303: The UE determines, according to the modulation and coding indication information of the SCI X, whether to further decode the PSSCH scheduled by the SCI X.

Embodiment 21

Generally, during the initial transmission of a data packet, if the coding rate exceeds 0.93, the UE may not be unable to correctly decode the data packet, so that the UE cannot decode this data packet. In the LTE Rel-8 system, during the definition of the TBS (Tables 7.1.7.2.1-1 to 7.1.7.2.5-1 in 3GPP TS 36.213), when $I_{TBS}$=0~25, the number of resources for TB mapping is assumed as 120 resources elements (REs) contained in each PRB; and, when $I_{TBS}$=26, the number of resources for TB mapping is assumed as 136 resources elements (REs) contained in each PRB. Therefore, the effective coding rate determined according to the TBS in the tables and the number of physical resources for TB mapping does not exceed 0.93. However, in the V2X communication in LTE Rel-14/15, among 14 symbols of a subframe, since the first symbol is used for Automatic Gain Control (AGC) adjustment, the $3^{th}$, $6^{th}$, $9^{th}$ and $12^{th}$ symbols are used for mapping demodulation reference signals (DM-RSs) and the last symbol is used as a gap, therefore, there are only eight symbols actually available for the effective transmission of data, that is, the number of resources for TB mapping is only 96 resources elements (REs) contained in each PRB. Therefore, if the MCS table (Table 2) in the LTE Rel-8 and the TBS table (Table 7.1.7.2.1-1 in 3GPP TS 36.213) are reused, it is likely that the effective coding rate of part of $I_{MCS}$ exceeds 0.93. In order to prevent the effective coding rate from exceeding 0.93, only the remaining $I_{MCS}$ can be used, so that the flexibility of supportable TBSs is decreased. Particularly after supporting 64 QAM, for example, in Table 2, all $I_{MCS}$ greater than 23 cannot be used. Similarly, in the V2X communication in LTE Rel-14/15 or NR, one V2X transmission can occupy less time resources. For example, only one time slot (i.e., 7 symbols) can be occupied. If half a symbol is used for AGC adjustment, half a symbol is used as a gap and the $3^{th}$ and $6^{th}$ symbols are used for mapping DM-RSs, that is, the number of resources for TB mapping is only 48 resources elements (REs) contained in each RPB. Moreover, in the future communication systems, one V2X transmission may occupy less time resources. If the MCS table (Table 2) in the LTE Rel-8 and the TBS table (Table 7.1.7.2.1-1 in 3GPP TS 36.213) are reused, it is likely that the effective coding rate of more $I_{MCS}$ exceeds 0.93. In order to avoid the reduction of the number of available $I_{MCS}$, this embodiment proposes that the TBS can be determined by one of the following ways.

Way 1 for determining TBS: The number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N_{PRB}$ by looking up the Table 7.1.7.2.1-1 in 3GPP TS 36.213, wherein, $N_{PRB}$=max$\{\lfloor N'_{PRB} \times \beta \rfloor, 1\}$.

Preferably, $\beta$=0.75, or $\beta$=0.8, or $\beta$=⅔, or $\beta$ is a non-negative number not greater than 1 configured by a higher layer.

Preferably, for PSSCHs having different transmission time lengths, the used $\beta$ can be different. For example, when the length of the time resource occupied by the transmitted PSSCH is 1 ms, the used $\beta$ is equal to 0.75; and, when the length of the time resource occupied by the transmitted PSSCH is 0.5 ms, the used $\beta$ is equal to 0.375. Or, when the length of the time resource occupied by the transmitted PSSCH is 1 ms, the used $\beta$ is equal to 1, that is, the number of PRBs occupied by the PSSCH scheduled by the PSCCH is $N'_{PRB}$, and the TBS is determined according to $N'_{PRB}$ by looking up the Table 7.1.7.2.1-1 in 3GPP TS 36.213; and, when the length of the time resource occupied by the transmitted PSSCH is 0.5 ms, the used $\beta$ is equal to 0.5, wherein, $N_{PRB}$=max$\{\lfloor N'_{PRB} \times \beta \rfloor, 1\}$.

For example, when $I_{MCS}$=25, it is determined that $I_{TBS}$=23 according to Table 2. If it is assumed that the number of PRBs indicated by the received PSCCH is 40, the prior art is as follows: according to the 40 PRBs and by looking up the Table 7.1.7.2.1-1 in 3GPP TS 36.213, the TBS is determined as 22920, and the effective coding rate is greater than 0.93. However, in the way 1 in this embodiment, $N_{PRB}$=$\{\lfloor 40 \times 0.8 \rfloor, 1\}$=32 is determined first, and the TBS is then determined as 18336 according to the 32 PRBs by looking up the Table 7.1.7.2.1-1 in 3GPP TS 36.213. In this case, the effective coding rate is less than 0.93.

Way 2 for determining TBS: When $I_{MCS}$>Th_mcs1, the number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N_{PRB}$ by looking up the Table 7.1.7.2.1-1 in 3GPP TS 36.213, wherein, $N_{PRB}$=max$\{\lfloor "_{PRB} \times \beta \rfloor, 1\}$; and, when $I_{MCS}$≤Th_mcs1, the number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N'_{PRB}$ by looking up the Table 7.1.7.2.1-1 in 3GPP TS 36.213.

Preferably, for different PSSCH transmission time lengths, the Th_mcs1 is defined independently or configured independently.

Preferably, the Th_mcs1 is predefined by the standard. As an implementation, the Th_mcs1 in this embodiment is equal to the Th_mcs in Embodiment 1. As another implementation, the Th_mcs1 in this embodiment and the Th_mcs in Embodiment 1 are defined independently. Of course, it is also possible that only one of the Th_mcs1 and the Th_mcs is defined by the standard, or both are not defined.

Preferably, the Th_mcs1 predefined by the standard is the minimum $I_{MCS}$ corresponding to 64 QAM, for example, Th_mcs1=21.

Preferably, when the length of the time resource occupied by the transmitted PSSCH is 1 ms, the Th_mcs1 is the minimum $I_{MCS}$ corresponding to 64 QAM; and, when the length of the time resource occupied by the transmitted PSSCH is less than 1 ms, Th_mcs1=−1, that is, for all MCSs, $N_{PRB}$=max$\{\lfloor N'_{PRB} \times \beta \rfloor, 1\}$.

Preferably, when the length of the time resource occupied by the transmitted PSSCH is 1 ms, the Th_mcs1 predefined by the standard is equal to 18. Advantageously, after all $I_{MCS}$ corresponding to 64 QAM and $I_{MCS}$ in 16 QAM possibly resulting in an effective coding rate greater than 0.93 are weighted by $N'_{PRB}$ in the Table 7.1.7.2.1-1, the effective coding rate of the TBS corresponding to the weighted $N'_{PRB}$ (i.e., $N'_{PRB}$) is less than or equal to 0.93.

Preferably, the Th_mcs1 is determined with respect to the number of PRBs possibly occupied by the PSSCH, so that, after all $I_{MCS}$ corresponding to 64 QAM and $I_{MCS}$ in 16 QAM possibly resulting in an effective coding rate greater than 0.93 are weighted by $N'_{PRB}$, the effective coding rate of the corresponding TBS is less than or equal to 0.93.

Preferably, when the length of the time resource occupied by the transmitted PSSCH is 1 ms, the Th_mcs1 predefined by the standard is set according to the maximum number of transmissions of the PSSCH, for example, the minimum MCS index corresponding to the effective coding rate greater than 0.93 after two PSSCH transmissions are combined. During the determination of Th_mcs1, as an implementation, the effective coding rate is calculated according to the modulation scheme $Q'=\min(4,Q'_m)$. Advantageously, this implementation is the same as the calculation method in the Rel-14 V2X UE. As another implementation, the effective coding rate is calculated according to the modulation scheme $Q'=Q'_m$. For example, if the effective coding rate is calculated according to the 16 QAM, the Th_mcs1=23. Advantageously, when $I_{MCS}<$Th_mcs1, the way for determining TBS is the same as that in the Rel-14 V2X, that is, the TBS is determined by the $N'_{PRB}$ indicated by the PSCCH, so that the first-type V2X UE can decode the PSSCH scheduled by the PSCCH transmitted by the second-type V2X UE; and, when $I_{MCS}\geq$Th_mcs1, the TBS is determined after weighting the $N'_{PRB}$ indicated by the PSCCH. In this case, since the coding rate corresponding to the TBS determined by the Rel-14 V2X already exceeds 0.93, the first-type V2X UE is unable to decode the PSSCH. For the second-type V2X UE, the TBS can be determined after weighting the $N'_{PRB}$, so that the second-type V2X UE can correctly decode the PSSCH. For another example, if the effective coding rate is calculated according to the 64 QAM, the Th_mcs1=26. It is to be noted that the above-mentioned numerical values are merely examples. For this description purpose, there may also be other values according to different system designs.

Preferably, for PSSCH having different transmission time lengths, the used β may be different.

Preferably, the value of Th_mcs1 is not predefined by the standard, but it is determined that the value of Th_mcs1 is predefined by the standard. For example, as described above, the value of Th_mcs1 is determined according to the maximum number of transmissions of the PSSCH, for example, determined by the minimum MCS index corresponding to the effective coding rate greater than 0.93 after two PSSCH transmissions are combined. When the actual number of PRBs occupied by the scheduled PSSCH is different, the value of Th_mcs1 may be different. Or, when the actual time length occupied by the scheduled PSSCH is different, the value of Th_mcs1 may be different.

Way 3 for determining TBS: If the V2X UE can identify whether the received PSCCH is from the first-type V2X UE or the second-type V2X UE:

1) if the received PSCCH is from the first-type V2X UE, the number $N'_{PRB}$ of PRBs occupied by the PSSCH scheduled by the PSCCH is determined according to the information "frequency-domain resource location for initial transmission and retransmission" indicated in the received PSCCH; and the TBS is determined according to $N'_{PRB}$ by looking up the Table 7.1.7.2.1-1 in TS 36.213.

2) if the received PSCCH is from the second-type V2X UE, the number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N_{PRB}$ by looking up the Table 7.1.7.2.1-1 in 3GPP TS 36.213, wherein, $N_{PRB}=\max\{\lfloor N'_{PRB} \times \beta \rfloor, 1\}$. Or, if the received PSCCH is from the second-type V2X UE, when $I_{MCS}>$Th_mcs1, the number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N_{PRB}$ by looking up the Table 7.1.7.2.1-1 in 3GPP TS 36.213, wherein, $N_{PRB}=\max\{\lfloor N'_{PRB} \times \beta \rfloor, 1\}$; and, when $I_{MCS}\leq$Th_mcs1, the number $N'_{PRB}$ of PRBs occupied by the PSSCH scheduled by the PSCCH is determined according to the information "frequency-domain resource location for initial transmission and retransmission" indicated in the received PSCCH, and the TBS is determined according to $N'_{PRB}$ by looking up the Table 7.1.7.2.1-1 in 3GPP TS 36.213.

This embodiment can be implemented by steps 2401 to 2403.

Step 2401: A UE detects a PSCCH in format of SCI X transmitted by other UEs.

Step 2402: The UE determines a TBS according to indication information "MCS" (an MCS bit field) and information "frequency-domain resource location for initial transmission and retransmission" of the SCI X.

Preferably, for the second-type V2X UE, the TBS is determined according to one of the ways 1 to 3 in this embodiment.

Step 2403: The UE decodes the PSSCH according to the information of the SCI X.

Embodiment 22

In a communication system, if transmitted signals employ different modulation schemes, the required transmitting power is different in order to realize the same correct reception probability. For example, when the modulation order is higher, to realize the same coverage range, the required transmitting power is relatively high. Meanwhile, the required transmitting power for realizing the same correct reception probability is also related to the number of transmissions. For example, if at least 3 dB of gain is achieved by combining two transmissions when compared to one transmission, to realize the same coverage range, the transmitting power required by two transmissions is not greater than half of the transmitting power required by one transmission.

Therefore, in this embodiment, the Power Spectrum Density (PSD) of a PSSCH in format of SCI X and the PSD of a PSSCH scheduled by the PSCCH should be determined according to the modulation scheme of the PSSCH and/or the modulation scheme of the PSCCH. For example, the power of the PSSCH can be determined first, and the power of the PSCCH is then determined according to a PSD offset relative to the PSSCH. The PSD offset is determined according to the modulation scheme of the PSSCH and/or the modulation scheme of the PSCCH.

Specifically, the PSD offset can be determined by one of the following ways 1 to 3.

Way 1: The PSD offset between the PSSCH and the PSCCH is not related to the relationship between the modulation scheme of the PSSCH and the modulation scheme of the PSCCH, and the total power of the PSSCH and the PSCCH increases with the increase in the modulation scheme of the PSSCH and/or the modulation scheme of the PSCCH.

For example, for a V2X UE working in the mode 3, the total power A of the PSSCH and the PSCCH is:

$$A = 10 \log_{10}(M_{PSSCH} + 10^{\gamma} \times M_{PSCCH}) + P_{O\_PSCCH,3} + \alpha_{PSCCH,3} \cdot PL + 10 \log 10(\eta) \quad (1)$$

wherein, η is a parameter related to the modulation scheme. For example, $\eta = Q'_m/Q'_{mPSCCH}$, wherein, $Q'_m$ is the modulation scheme of the PSSCH, and $Q'_{mPSCCH}$ is the modulation scheme of the PSCCH. For example, if the modulation scheme of the PSCCH is QPSK, $Q'_{mPSCCH}=2$.

Or, $$\eta = \begin{cases} 1, & \text{if } Q'_m = 2 \text{ or } 4 \\ f(Q'_m), & \text{if } Q'_m > 4 \end{cases},$$

wherein, $f(Q'_m)$ is a function using $Q'_m$ as a variable and increases with the increase of $Q'_m$.

Or, $\eta = 10 \log_{10}((2^{X \cdot K_s}-1))$, wherein, X is a parameter related to $Q'_m$, X monotonically increases with $Q'_m$, and $K_s$ is a parameter configured by the higher layer. For example, if $K_s=0$, the total power A of the PSSCH and the PSCCH does not change with the modulation scheme; and, if $K_s>0$, the total power A monotonically increases with $Q'_m$.

Wherein, γ is the PSD offset between the PSSCH and the PSCCH defined by the standard, or a parameter configured by the higher layer. For example, γ=0.3. In the formula (1), $M_{PSSCH}$ is the number of RBs occupied by the PSSCH, $M_{PSCCH}$ is the number of RBs occupied by the PSCCH, $P_{O\_PSSCH,3}$ and $\alpha_{PSSCH,3}$ are parameters configured by the higher layer, PL is the path loss, and $P_{CMAX}$ is the maximum transmitting power.

The power of the PSCCH and the power of the PSSCH are as follows:

$$P_{PSCCH} = 10\log_{10}\left(\frac{10^\gamma \times M_{PSCCH}}{M_{PSSCH} + 10^\gamma \times M_{PSCCH}}\right) \; [dBm]$$

$$P_{PSSCH} = 10\log_{10}\left(\frac{M_{PSSCH}}{M_{PSSCH} + 10^\gamma \times M_{PSCCH}}\right) \; [dBm]$$

It is not hard to see that the ratio $P_{PSCCH}/P_{PSSCH}=10 \log 10(10^\gamma M_{PSCCH}/M_{PSSCH})$ of the power of the PSCCH to the power of the PSSCH is not related to the ratio of their modulation schemes.

Way 2: The PSD offset between the PSSCH and the PSCCH is related to the relationship between the modulation scheme of the PSSCH and the modulation scheme of the PSCCH, and the total power of the PSSCH and the PSCCH increases with the increase in the modulation scheme of the PSSCH and/or the modulation scheme of the PSCCH.

For example, for a V2X UE working in the mode 4, if the maximum transmitting power (maxTxpower) is configured by the higher layer, the total power A of the PSSCH and the PSCCH is calculated by:

$$A=\min\{P_{CMAX}, P_{MAX\_CBR\_} 10 \log_{10}(M_{PSSCH}+10^{\gamma-\lambda}M_{PSCCH})+P_{O\_PSSCH,4}+\alpha_{PSSCH,4} \cdot PL\} \quad (2)$$

Otherwise:

$$A=\min\{P_{CMAX}, 10 \log_{10}(M_{PSSCH}+10^{\gamma-\lambda}\times M_{PSCCH})+P_{O\_PSSCH,4}+\alpha_{PSSCH,4} \cdot PL\} \quad (3)$$

In the formulae (2) and (3), $M_{PSSCH}$ is the number of RBs occupied by the PSSCH, $M_{PSCCH}$ is the number of RBs occupied by the PSCCH, $P_{O\_PSSCH,4}$ and $\alpha_{PSSCH,4}$ are parameters configured by the higher layer, PL is the path loss, and $F_{MAX\_CBR}$ is a value determined according to a Channel Busy Ratio (CBR), and $P_{CMAX}$ is the maximum transmitting power.

It is assumed that the ratio of the power of the PSSCH to the power of the PSCCH is λ, and λ is a parameter related to the modulation scheme and decreases with the increase of $Q'_m$. For example, $\lambda=(10 \log_{10}(Q'_m/Q'_{mPSCCH}))$ or $$\lambda = \begin{cases} 0, & \text{if } Q'_m = 2 \text{ or } 4 \\ f(Q'_m), & \text{if } Q'_m > 4 \end{cases},$$

wherein, $f(Q'_m)$ is a function using $Q'_m$ as a variable. For example, when $Q'_m=6$, $\lambda=\log 10(3)$.

The power of the PSSCH is calculated by:

$$P_{PSSCH} = 10\log_{10}\left(\frac{M_{PSSCH}}{M_{PSSCH} + 10^{\gamma-\lambda} \times M_{PSCCH}}\right) + A \; [dBm]$$

The power of the PSCCH is calculated by:

$$P_{PSCCH} = 10\log_{10}\left(\frac{10^{\gamma-\lambda} \times M_{PSCCH}}{M_{PSSCH} + 10^{\gamma-\lambda} \times M_{PSCCH}}\right) + A \; [dBm]$$

Way 3: The PSD of the PSCCH and/or the PSD of the PSSCH is determined according to the modulation scheme of the PSCCH and/or the modulation scheme of the PSSCH.

For example, the power of the PSCCH is calculated by:

$$P_{PSCCH} = 10\log_{10}\left(\frac{10^\gamma \times M_{PSCCH}}{M_{PSSCH} + 10^\gamma \times M_{PSCCH}}\right)$$

wherein, $\eta_1$ is a parameter related to the modulation scheme of the PSCCH. For example, $\eta_1=Q'_{mPSCCH}/2$. It is not hard to see that, if the PSCCH uses QPSK, the PPSCCH does not change with the introduction of the modulation scheme. When the PSCCH uses 16 QAM, the $P_{PSCCH}$ has an increment of 3 dB in comparison to the $P_{PSCCH}$ in QPSK.

Similarly, the power of the PSSCH is calculated by:

$$P_{PSSCH} = 10\log_{10}\left(\frac{M_{PSSCH}}{M_{PSSCH} + 10^\gamma \times M_{PSCCH}}\right)$$

wherein, $\eta_2$ is a parameter related to the modulation scheme of the PSSCH. For $$\eta_2 = \begin{cases} 1, & \text{if } Q'_m = 2 \text{ or } 4 \\ f(Q'_m), & \text{if } Q'_m > 4 \end{cases},$$

wherein, $f(Q'_m)$ is a function using $Q'_m$ as a variable and increases with the increase of $Q'_m$. For example, when the PSSCH uses 64 QAM, $\eta_2=3$; and, when the PSSCH uses QPSK or 16 QAM, $\eta_2=1$. It is not hard to see that, if the PSSCH uses QPSK, the $P_{PSSCH}$ does not change with the introduction of the modulation scheme. When the PSSCH uses 64 QAM, the $P_{PSSCH}$ has an increment of 4.7 dB in comparison to the $P_{PSSCH}$ in QPSK.

The present application provides a user equipment, comprising a control information detecting module, a parameter determining module, a transmission resource selecting module and a decoding module, wherein:

the control information detecting module, for receiving a Physical Sidelink Control Channel (PSCCH) transmitted by other UEs and detecting Sidelink Control Information (SCI) transmitted through the PSCCH;

the parameter determining module, for determining parameter information of a Physical Sidelink Shared Channel (PSSCH) scheduled by the SCI according to the SCI;

the transmission resource selecting module, for determining, according to the parameter information of the PSSCH, whether to receive and measure PSSCH-RSRP of the PSSCH scheduled by the SCI and/or a sidelink received signal strength indicator (S-RSSI), and selecting a transmission resource according to the measured information; and the decoding module, for receiving, according to the SCI, the PSSCH scheduled by the SCI, and determining, according to the SCI, whether to decode the PSSCH.

The present invention further provides a user equipment, comprising a transmitted power determining module and a transmitting module, wherein:

for Sidelink Control Information (SCI) carried on a Physical Sidelink Control Channel (PSCCH) and a Physical Sidelink Shared Channel (PSSCH) scheduled by the SCI, the transmitting power determining module, for determining a Power Spectrum Density (PSD) offset of the PSSCH and the PSCCH by at least one of the following ways:

way 1: the PSD offset of the PSCCH relative to the PSSCH is not related to a modulation scheme of the PSSCH and a modulation scheme of the PSCCH, and the total power of the PSSCH and the PSCCH increases with the increase of the modulation scheme of the PSSCH and/or the modulation scheme of the PSCCH;

way 2: the PSD offset of the PSCCH relative to the PSSCH is related to a modulation scheme of the PSSCH and a modulation scheme of the PSCCH, and the total power of the PSSCH and the PSCCH increases with the increase of the modulation scheme of the PSSCH and/or the modulation scheme of the PSCCH; and way 3: the PSD of the PSSCH is determined according to the modulation scheme of the PSSCH; and the transmitting module, for performing transmission according to the power determined by the transmitting power determining module.

It should be understood by those skilled in the art that the present invention involves apparatuses for performing one or more of operations as described in the present application. Those apparatuses may be specially designed and manufactured as intended, or may comprise known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, and the computer readable media include but are not limited to any type of disks (including floppy disks, hard disks, optical disks, CD-ROM and magneto optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical cards. That is, readable media include any media storing or transmitting information in a device (for example, computer) readable form.

It may be understood by those skilled in the art that computer program instructions may be used to implement each block in structure diagrams and/or block diagrams and/or flowcharts as well as combination of blocks in the structure diagrams and/or block diagrams and/or flowcharts. It may be understood by those skilled in the art that these computer program instructions may be provided to general-purpose computers, special computers or other processors of programmable data processing means, so that solutions designated in a block or blocks of the structure diagrams and/or block diagrams and/or flowcharts disclosed in the present disclosure are implemented by computers or other processors of programmable data processing means.

It may be understood by those skilled in the art that the operations, methods, steps in the flows, measures and solutions already discussed in the present invention may be alternated, changed, combined or deleted. Further, the operations, methods, other steps in the flows, measures and solutions already discussed in the present invention may also be alternated, changed, rearranged, decomposed, combined or deleted. Further, prior arts having the operations, methods, the steps in the flows, measures and solutions disclosed in the present invention may also be alternated, changed, rearranged, decomposed, combined or deleted.

The foregoing description covers merely preferred embodiments of the present invention. It should be noted that, for those ordinary skilled in the art, various modifications and embellishments can be made without departing from the principle of the present invention. Such modifications and embellishments shall be regarded as falling into the protection scope of the present invention.

The invention claimed is:

1. A method performed by a first terminal in a wireless communication system, the method comprising:
identifying that the first terminal is out of coverage of a cell, selecting a second terminal as a synchronization reference;
receiving, from the second terminal, a first sidelink synchronization signal (SLSS) based on time position information included in a configuration for a sidelink communication;
selecting an SLSS identifier (SLSSID) for the sidelink communication based on the first SLSS received from the second terminal; and
transmitting a second SLSS based on the SLSSID,
wherein the second terminal is out of coverage of the cell, and
wherein the first SLSS received from the second terminal is based on a global navigation satellite system (GLASS).

2. The method of claim 1, wherein the time position information includes a time offset for identifying a slot in which the first SLSS is received, and
wherein the SLSSID of the first terminal is selected as 337.

3. The method of claim 1, wherein the time position information includes a sync offset indication value for identifying a subframe in which the first SLSS is received, and
wherein the SLSSID of the first terminal is selected as 169.

4. T method of claim 1, wherein an SLSSID of the second terminal is selected as 0.

5. A first terminal in a wireless communication system, the first terminal comprising
a transceiver configured to transmit and receive a signal; and
a controller coupled with the transceiver and configured to:
identify that the first terminal is out of coverage of a cell,
select a second terminal as a synchronization reference, receive, from the second terminal, a first sidelink synchronization signal (SLSS) based on time position information included in a configuration for a sidelink communication, select an SLSS identifier (SLSSID) for the sidelink communication based on the first SLSS received from the second terminal, and transmit a second SLSS based on the SLSSID, wherein the second terminal is out of coverage of the cell, and wherein the first SLSS received from the second terminal is based on a global navigation satellite system (GNSS).

6. The first terminal of claim 5, wherein the time position information includes a time offset for identifying a slot in which the first SLSS is received, and wherein the SLSSID of the first terminal is selected as 337.

7. The first terminal of claim 5, wherein the time position information includes a sync offset indication value for identifying a suhframe in which the first SLSS is received, and wherein the SLSSID of the first terminal is selected as 169.

8. The first terminal of claim 5, wherein an SLSSID of the second terminal is selected as 0.

9. A method performed by a second terminal in a wireless communication system, the method comprising:

identifying that the second terminal is out of coverage of a cell and uses global navigation satellite system (GNSS) as a synchronization reference;

selecting a sidelink synchronization signal (SLSS) identifier (SLSSID) for sidelink communication; and transmitting, to a first terminal out of coverage of the cell, an SLSS based on time position information included in a configuration for the sidelink communication, wherein the second terminal is selected as a synchronization reference for the first terminal, and wherein an SLSSID of the first terminal is selected based on the transmitted SLSS.

10. The method of claim 9, wherein the time position information includes a time offset for identifying a slot in which the SLSS is transmitted, and wherein the SLSSID of the first terminal is selected as 337.

11. The method of claim 9, wherein the time position information includes a sync offset indication value for identifying a subframe in which the SLSS is transmitted, and wherein the SLSSID of the first terminal is selected as 169.

12. The method of claim 9, wherein an SLSSID of the second terminal is selected as 0.

13. A second terminal in a wireless communication system, the second terminal comprising:

a transceiver configured to transmit and receive a signal; and a controller coupled with the transceiver and configured to:

identify that the second terminal is out of coverage of a cell and uses global navigation satellite system (GNSS) as a synchronization reference, select a sidelink synchronization signal (SLSS) identifier (SLSSID) for sidelink communication, and transmit, to a first terminal out of coverage of the cell, an SLSS based on time position information included in a configuration for the sidelink communication, wherein the second terminal is selected as a synchronization reference for the first terminal, and wherein an SLSSID of first terminal is selected based on the transmitted SLSS.

14. The second terminal of claim 13, wherein the time position information includes a time offset for identifying a slot in which the SLSS is transmitted, and wherein the SLSSID of the first terminal is selected as 337.

15. The second terminal of claim 13, wherein the time position information includes a sync offset indication value for identifying a subframe in which the SLSS is transmitted, and wherein the SLSSID of the first terminal is selected as 169.

16. The second terminal of claim 13, wherein an SLSSID of the second terminal is selected as 0.

* * * * *